United States Patent
Cam-Winget et al.

(10) Patent No.: US 7,346,773 B2
(45) Date of Patent: Mar. 18, 2008

(54) ENABLING STATELESS SERVER-BASED PRE-SHARED SECRETS

(75) Inventors: Nancy Cam-Winget, Mountain View, CA (US); Hao Zhou, Solon, OH (US); Padmanabha C. Jakkahalli, Sunnyvale, CA (US); Joseph Salowey, Seattle, WA (US); David A. McGrew, Poolesville, MD (US)

(73) Assignee: Cisco Technology, Inc., San Jose, CA (US)

( * ) Notice: Subject to any disclaimer, the term of this patent is extended or adjusted under 35 U.S.C. 154(b) by 584 days.

(21) Appl. No.: 10/756,634

(22) Filed: Jan. 12, 2004

(65) Prior Publication Data

US 2005/0154873 A1 Jul. 14, 2005

(51) Int. Cl.
*H04L 9/00* (2006.01)
*G06F 15/16* (2006.01)

(52) U.S. Cl. .................. 713/155; 709/203; 713/168; 713/170; 726/5

(58) Field of Classification Search ............... 713/155; 709/203; 726/5
See application file for complete search history.

(56) References Cited

U.S. PATENT DOCUMENTS

| | | | |
|---|---|---|---|
| 5,268,962 A | 12/1993 | Abadi et al. | |
| 5,961,601 A | 10/1999 | Iyehgar | |
| 6,134,592 A | 10/2000 | Montulli | |
| 6,253,326 B1 * | 6/2001 | Lincke et al. | 713/168 |
| 6,263,437 B1 | 7/2001 | Liao et al. | |
| 6,496,932 B1 | 12/2002 | Trieger | |
| 6,938,171 B1 | 8/2005 | Isomichi et al. | |
| 2004/0015725 A1 | 1/2004 | Boneh et al. | |

OTHER PUBLICATIONS

T. Berners-Lee, et al., "Hypertext Markup Language—2.0," Nov. 1995, Network Working Group, Request for Comments: 1866, http://www.ietf.org/rfc/rfc1866.txt?number=1866, printed Jul. 10, 2003, pp. 1-72.

R. Fielding, et al., "Hypertext Transfer Protocol—HTTP/1.1," Jan. 1997, Network Working Group, Request for Comments: 2068, http://www.ietf.org/rfc/rfc2068.txt?number=2068, printed Jul. 10, 2003, pp. 1-152.

(Continued)

*Primary Examiner*—Gilberto Barron
*Assistant Examiner*—Laurel Lashley
(74) *Attorney, Agent, or Firm*—Hickman Palermo Truong & Becker LLP

(57) ABSTRACT

A method is disclosed for enabling stateless server-based pre-shared secrets. Based on a local key that is not known to a client, a server encrypts the client's state information. The client's state information may include, for example, the client's authentication credentials, the client's authorization characteristics, and a shared secret key that the client uses to derive session keys. By any of a variety of mechanisms, the encrypted client state information is provided to the client. The server may free memory that stored the client's state information. When the server needs the client's state information, the client sends, to the server, the encrypted state information that the client stored. The server decrypts the client state information using the local key. Because each client stores that client's own state information in encrypted form, the server does not need to store any client's state information permanently.

29 Claims, 13 Drawing Sheets

OTHER PUBLICATIONS

J. Jonsson, et al., "Public-Key Cryptography Standards (PKCS) #1: RSA Cryptography Specifications Version 2.1," Feb. 2003, Network Working Group, Request for Comments: 3347, http://www.ietf.org/rfc/rfc3447.txt?number=3447, printed Jul. 10, 2003, pp. 1-68.

B. Kaliski, et al., "PKCS #1 : RSA Cryptography Specifications Version 2.0," Oct. 1998, Network Working Group, Request for Comments: 2437, http://www.ietf.org/rfc/rfc2437.txt?number=2437, printed Jul. 10, 2003, pp. 1-37.

B. Kaliski, "PKCS #1, RSA Encryption Version 1.5," Mar. 1998, Network Working Group, Request for Comments: 2313, http://www.ietf.org/rfc/rfc2313.txt?number=2313, printed Jul. 10, 2003, pp. 1-18.

Thomas Wason, et al., "Liberty ID-FF Architecture Overview, Version 1.2," Liberty Alliance Project, www.project-liberty.org/, pp. 1-44, Aug. 11, 2003.

International Searching Authority, "Notification of Transmittal of the International Search Report and the Written Opinion of the International Searching Authority, or the Declaration," PCT/US05/00812, dated Jun. 14, 2006, 6 pages.

Claims, PCT/US05/00812, 10 pages.

Birk, Yitzhak, "Coding On Demand by an Informed Source (ISCOD) for Efficient Broadcast of Different Supplemental Data to Caching Clients," IEEE Transactions on Information Theory, vol. 52, No. 6, Jun. 2006, pp. 2825-2830.

Phatak, S.H., et al., "Web&: An Architecture for Non-Interactive Web," Internet Applications, 2001, WIAPP 2001, Proceedings of the Second IEEEE Workshop on Jul. 23-24, 2001, pp. 104-112.

Yao, Bin et al., "Proxy-based Recovery for Applications on Wireless Hand-held Devices," Reliable Distributed Systems 2000, SRDS-2000, Proceedings of the 19th IEEE Symposium on Oct. 16-18, 2000. pp. 2-10.

Dierks, T. et al., "The TLS Protocol-Version 1.0," Network Working Group, RFC 2246, Jan. 1999, retrieved from the internet at http://rfc.sunsite.dk/rfc/rfc2246.html, retrieved on Jun. 21, 2006, pp. 1, 4, 29-32, 68-69.

International Searching Authority, "Notification of Transmittal of the International Search Report and the Written Opinion of the International Searching Authority, or the Declaration," PCT/US06/11479, dated May 1, 2007, 8 pages.

Baker, F. et al. 'RSVP Cryptographic Authentication, Network Working Group, RFC 2747, Jan. 2000, 20 pages.

Braden, R. et al., Resource ReSerVation Protocol (RSVP), Network Working Group, RFC 2205, Sep. 1997, 105 pages.

Herzog, S. et al., ' RSVP Extension for Policy Control, Network Working Group, RFC 2750, Jan. 2000, 13 pages.

J. Salowey et al., "Transport Layer Security (TLS) Session Resumption without Server-Side State," IETF Request for Comments (RFC) 4507, May 2006, 16 pages.

N. Cam-Winget et al., "A TLS Hello Extension for Ticket Based Pre-Shared Keys," IETF Internet-Draft "draft-salowey-tls-ticket-00.txt," May 2004, 8 pages.

A. Pfitzmann et al., "Anonymity, Unlinkability, Unobservability, Pseudonymity, and Identify Management—A Consolidated Proposal for Terminology," Dresden University, Dec. 13, 2005, 48 pages.

H. Shacham et al., "Client Side Caching for TLS," Proceedings of the Internet Society's 2002 Symposium on Network and Distributed System Security, 2002, 26 pages.

H. Krawczyk et al., "HMAC: Keyed-Hashing for Message Authentication," IETF RFC 2104, Feb. 1997, 11 pages.

A. Medvinsky et al., "Addition of Kerberos Cipher Suites to Transport Layer Security (TLS)," IETF RFC 2712, Oct. 1999, 7 pages.

D. Eastlake III et al., "Randomness Requirements for Security," IETF RFC 4086, Jun. 2005, 45 pages.

C. Neuman et al., "The Kerberos Network Authentication Service (V5)," IETF RFC 4120, Jul. 2005, 129 pages.

P. Eronen et al., "Pre-Shared Key Ciphersuites for Transport Layer Security (TLS)," IETF RFC 4279, Dec. 2005, 15 pages.

T. Aura et al., "Stateless connections," Helsinki Univ. Technology, 1997, 11 pg.

"Transport Layer Security (TLS) Extensions," IETF RFC 2246, T. Dierks et al., Jan. 1999, 75 pages.

N. Cam-Winget et al., "EAP Flexible Authentication via Secure Tunneling (EAP-FAST)," IETF Internet-draft "draft-cam-winget-eap-fast-00.txt," Feb. 09, 2004, 100 pg.

P. Gutmann, "Use of Shared Keys in the TLS Protocol," IETF Internet-draft "draft-ietf-tls-sharedkeys-Jan. 2002.txt," Apr. 2004, 7 pages.

P. Eronen et al., "Pre-Shared Key Ciphersuites for Transport Layer Security (TLS)," IETF internet-draft "draft-eronen-tls-psk-00.txt," Feb. 6, 2004, 9 pages.

T. Dierks et al., "The Transport Layer Security (TLS) Protocol Version 1.1," IETF RFC 4346, Apr. 2006, 71 pages.

S. Blake-Wilson et al., "Transport Layer Security (TLS) Extensions," IETF RFC 4366, Apr. 2006, 25 pages.

Anonymous, "Specification for the Advanced Encryption Standard (AES)," US Government FIPS Publication 197, Nov. 26, 2001, 51 pages.

Anonymous, "Secure Hash Standard," US Government FIPS Publication 180-2, Aug. 1, 2002, 75 pages.

S. Blake-Wilson et al., "Transport Layer Security (TLS) Extensions," IETF RFC 3546, Jun. 2003, 24 pages.

M. Dworkin, "Recommendation for Block Cipher Modes of Operation," US Government NIST Special Publication 800-38A, 2001, 66 pages.

* cited by examiner

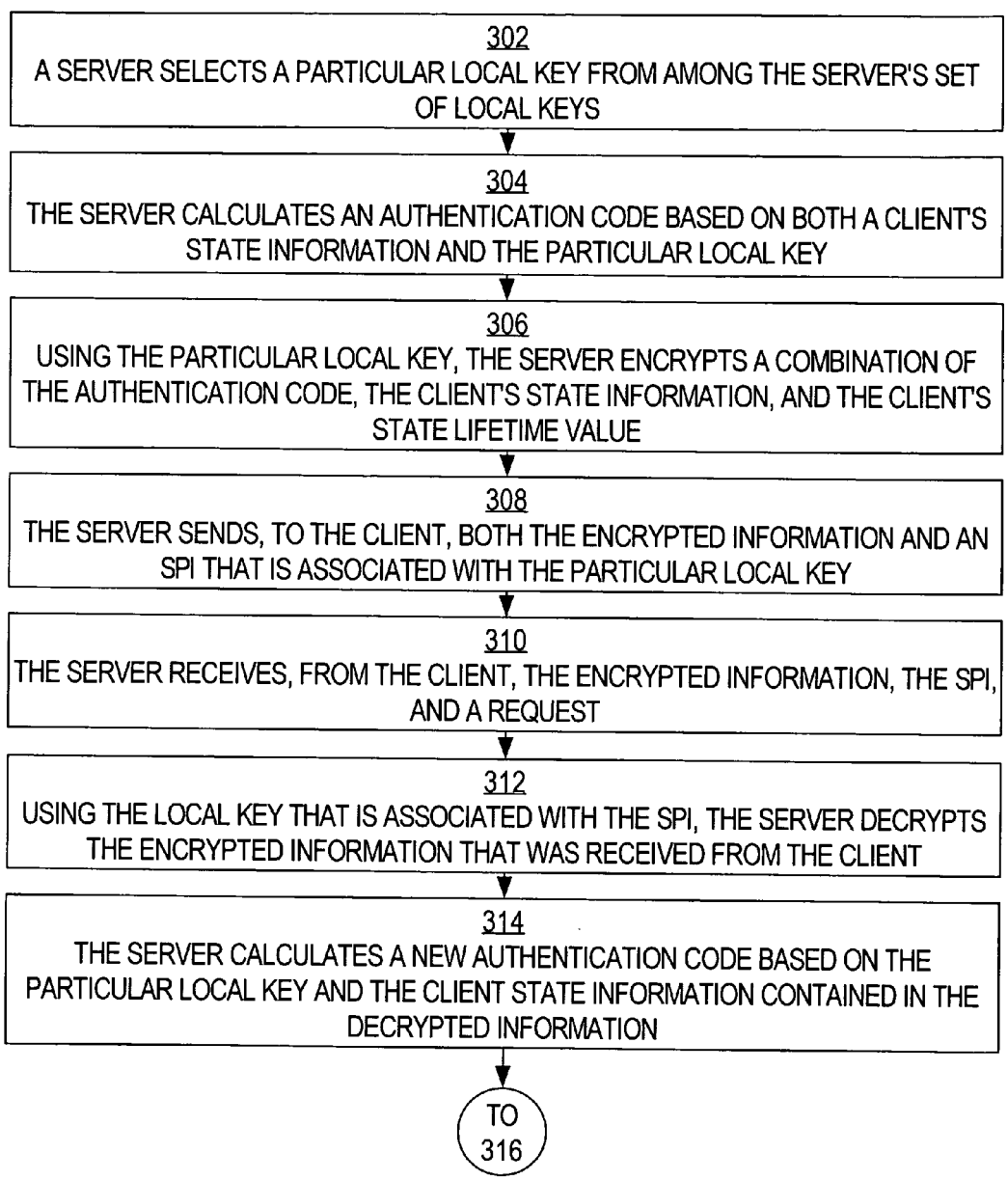

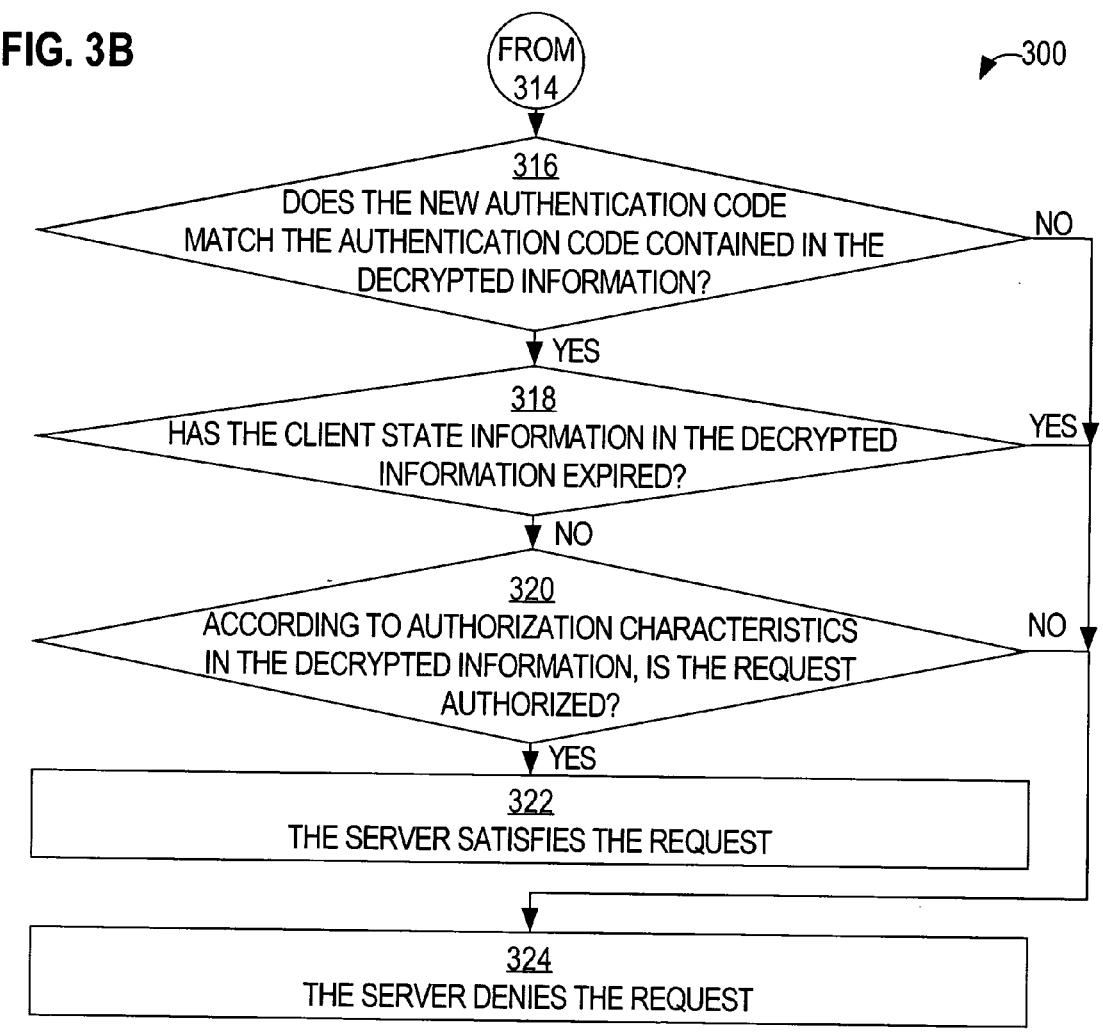

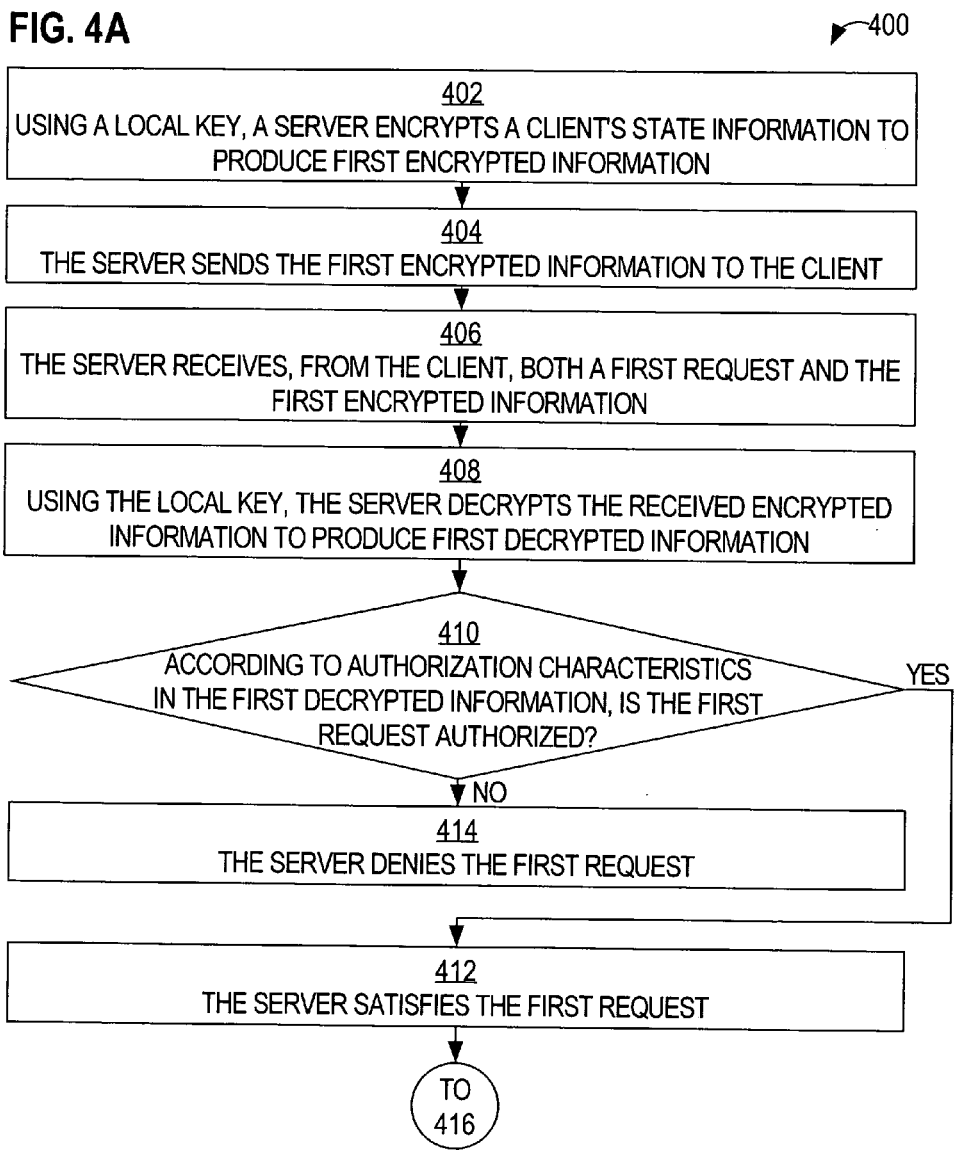

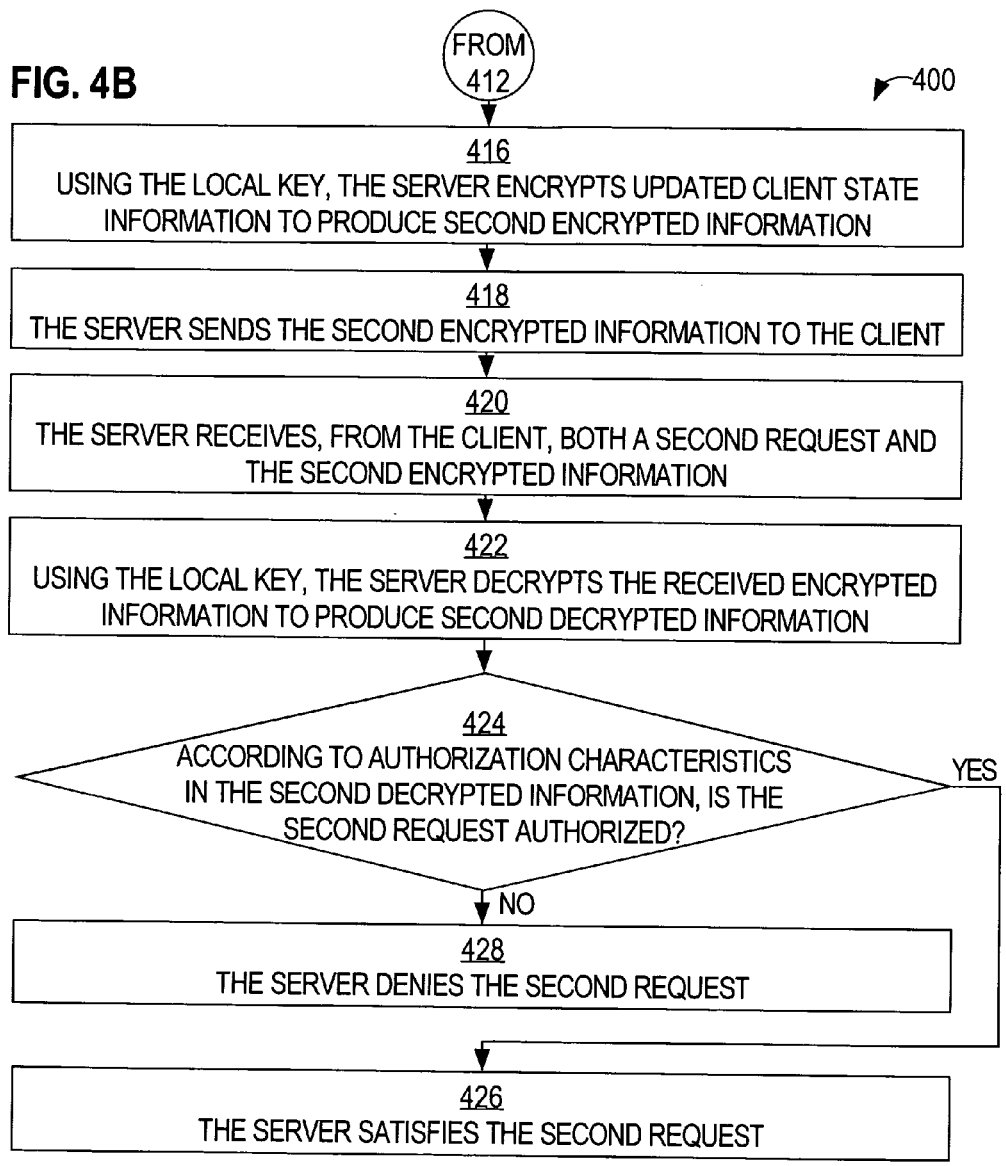

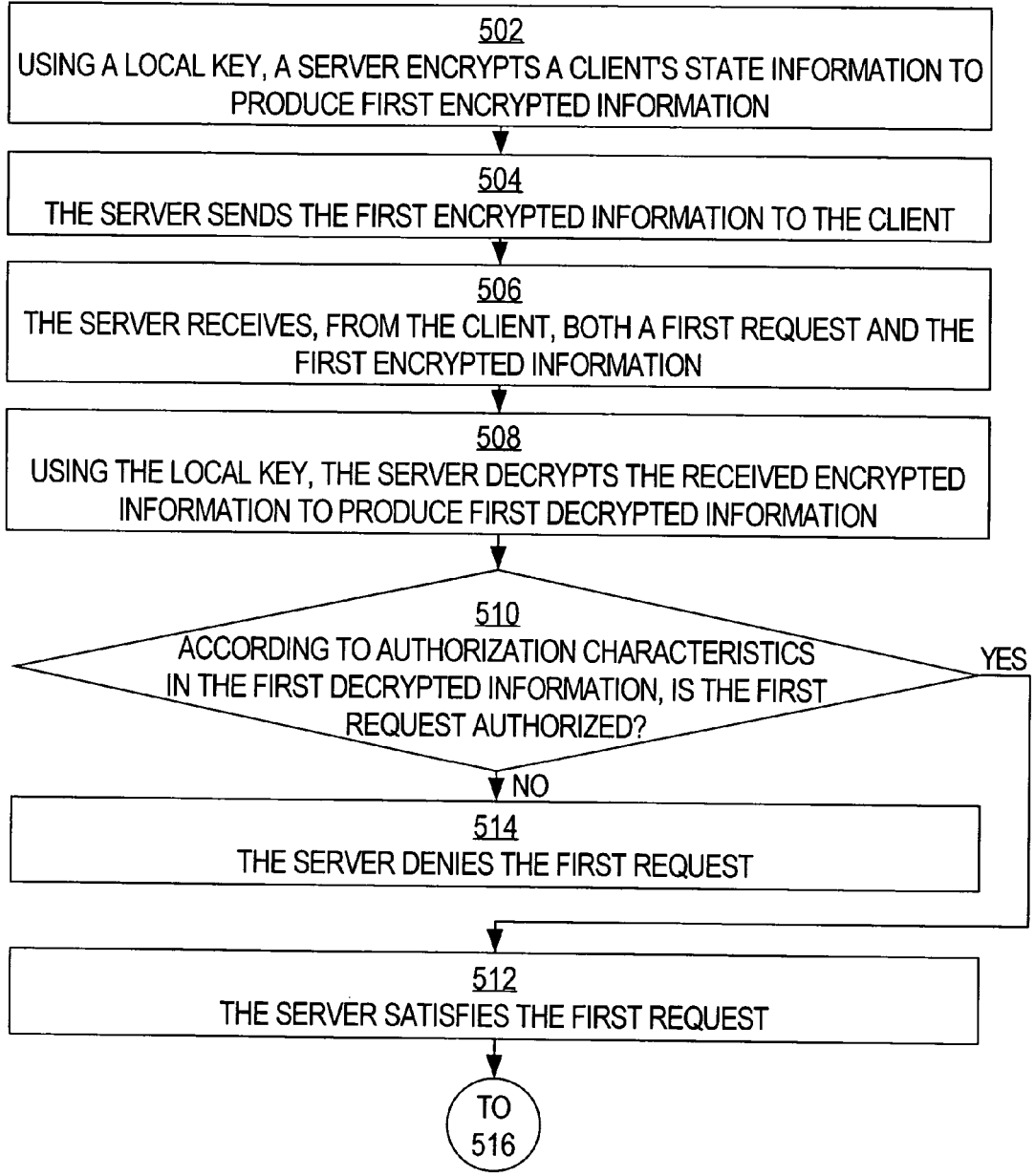

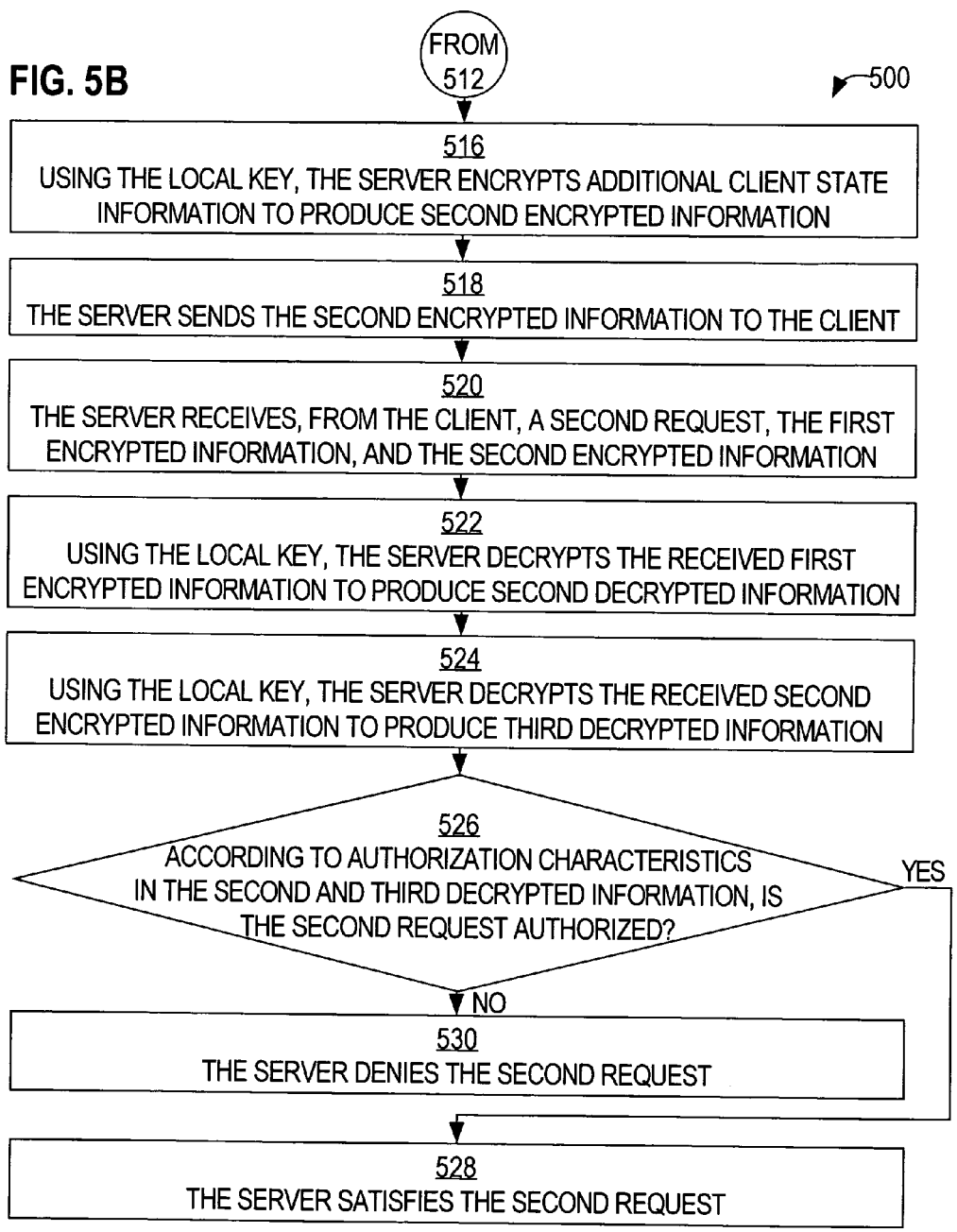

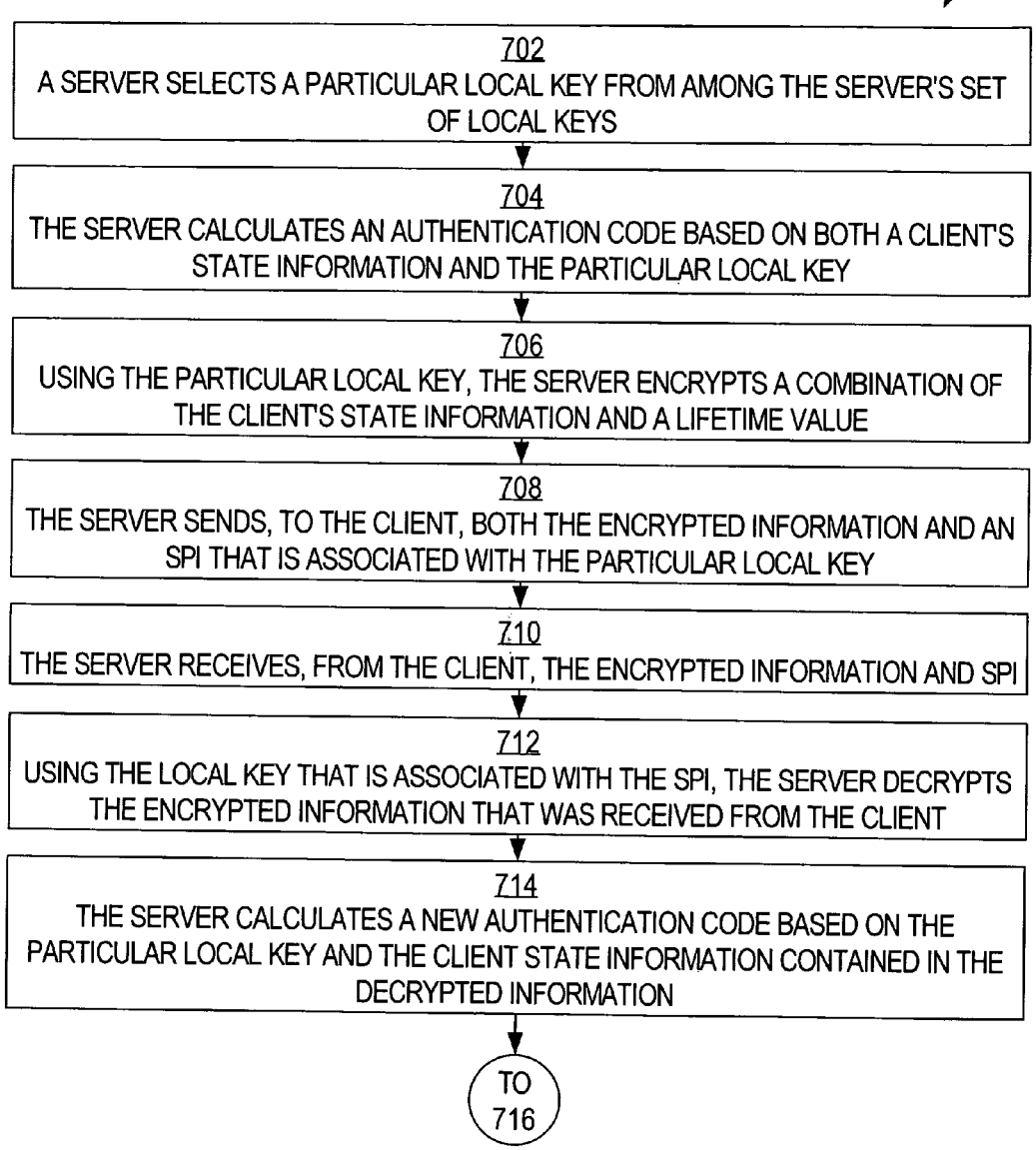

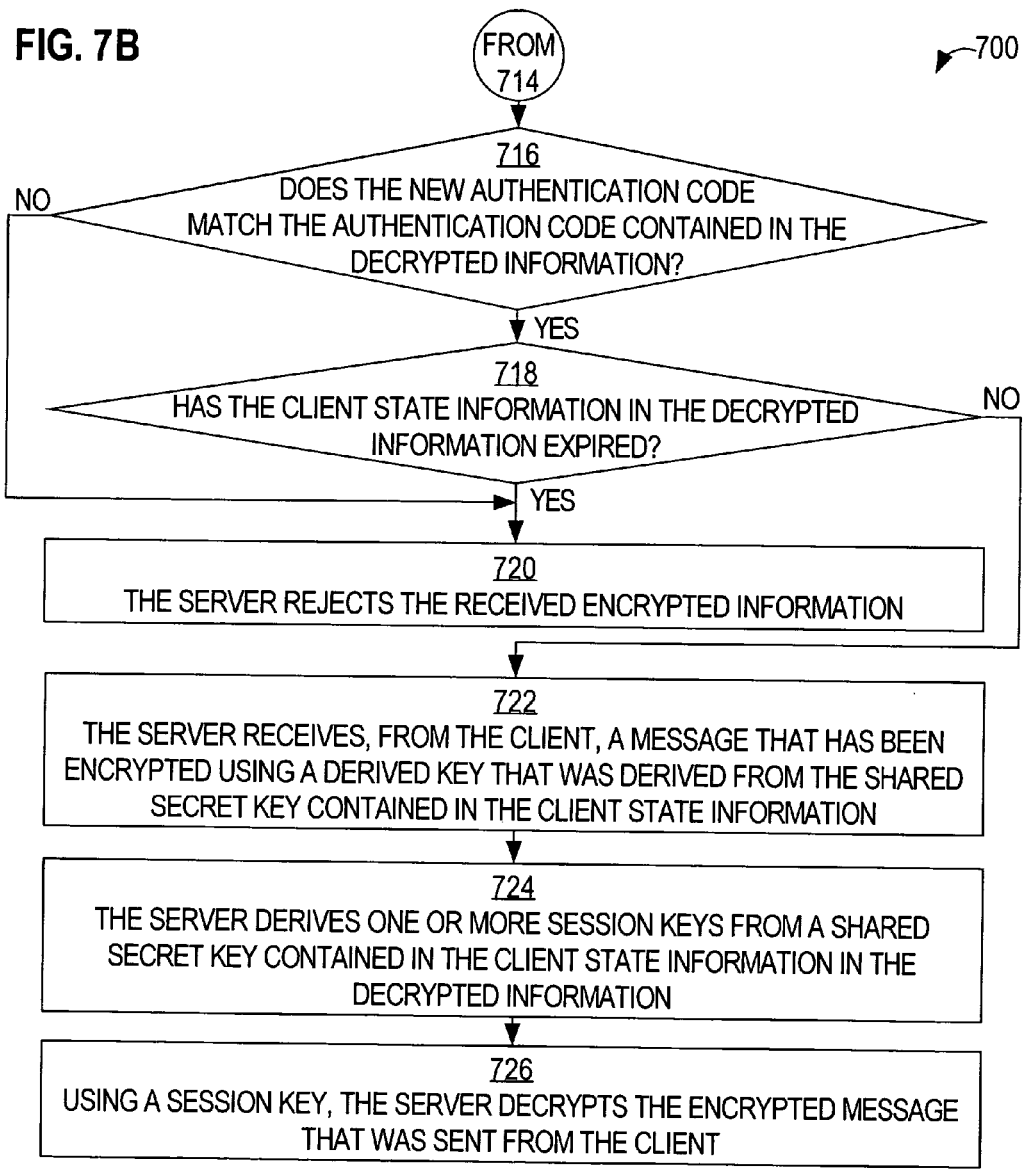

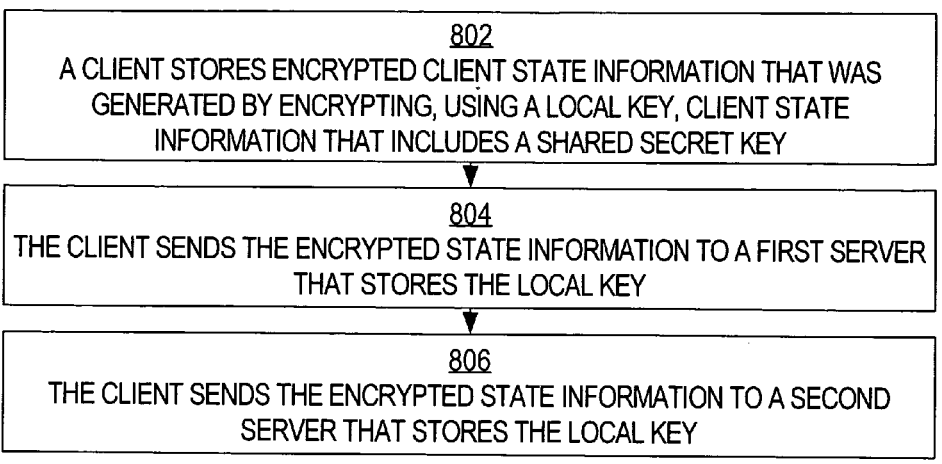
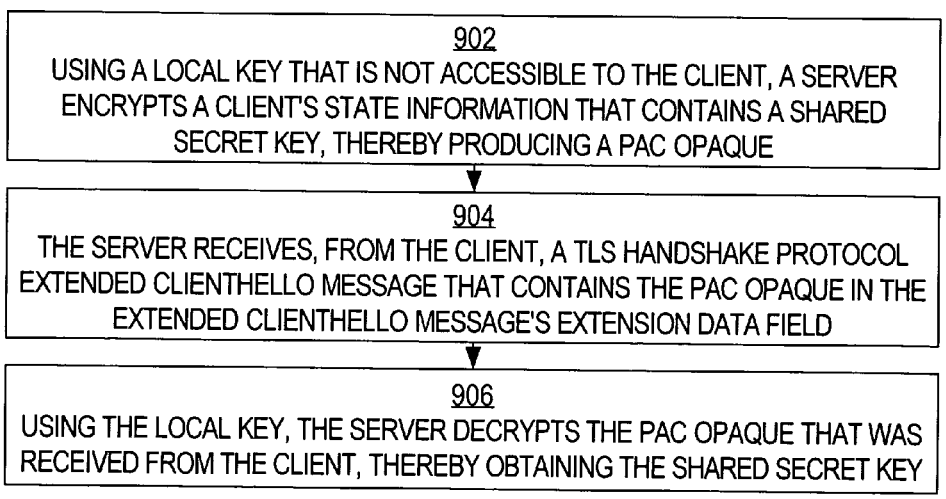

ENABLING STATELESS SERVER-BASED PRE-SHARED SECRETS

RELATED APPLICATIONS

This application is related to U.S. patent application Ser. No. 10/756,633 entitled "AVOIDING SERVER STORAGE OF CLIENT STATE", filed on the same day herewith; and U.S. patent application Ser. No. 10/411,964, entitled "METHOD AND APPARATUS FOR SECURELY EXCHANGING CRYPTOGRAPHIC IDENTITIES THROUGH A MUTUALLY TRUSTED INTERMEDIARY", filed Apr. 10, 2003. The entire contents of these applications are hereby incorporated by reference in their entirety for all purposes as if fully set forth herein.

FIELD OF THE INVENTION

The present invention generally relates to authentication, authorization, and security mechanisms for computer networks. The invention relates more specifically to a method and apparatus for enabling stateless server-based pre-shared secrets.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

To maintain the security of a private computer network, a client computer ("client") may be required to access the network by authenticating and establishing authorization to the network through a server computer ("server"). Prior to granting the client access to the network, the server may require the client to supply authentication credentials to the server so that the server can be certain that the client actually is the entity that the client purports to be. The client's authentication credentials indicate the client's identity. If the client's authentication credentials do not match authentication credentials that are stored on the server, then the server refuses the client access to the network. Even after a client has successfully authenticated itself, the server may restrict, based on authorization characteristics that are associated with the client and stored on the server, the client's access to network resources and/or the operations that the client can perform relative to the network resources.

It is not uncommon for unauthorized computers to attempt to eavesdrop on information that is communicated between an authorized client and a server. To prevent unauthorized computers from making use of information that the unauthorized computers should not have received, a client and a server may employ an encryption mechanism to protect information that will be communicated between the client and the server. According to one kind of encryption mechanism, the client and the server both derive one or more session keys from a shared secret key that only the client and the server possess. Before sending messages to each other, the client and the server encrypt the messages using the session keys. Using the session keys, the client and the server can decrypt the encrypted messages that they receive from each other. Computers that do not have the shared secret key cannot derive the session keys, and, consequently, cannot decrypt the encrypted messages communicated between the client and the server.

Multiple clients may access a private network through the same server. To prevent one client from masquerading as another client, different clients typically are associated with different authentication credentials. Different clients may be associated with different authorization characteristics. To prevent one client from making use of information intended exclusively for another client, different clients typically are provided with different shared secret keys. Collectively, a client's authentication credentials, authorization characteristics, and shared secret key are referred to as that client's state information.

According to one approach, a server stores, for each client, separate client state information. Where there are many clients, storing separate client state information for each client uses a large amount of memory. A server's expense is proportionate to the amount of memory that the server requires to store client state information.

Many existing network devices do not contain memory sufficient to store client state information for large numbers of clients. For example, the relatively small amount of memory available to some network routers prevents those network routers from performing the server functions described above when a large number of clients will be accessing a network. Many network routers do not have enough memory to concurrently store many different authentication credentials, authorization characteristics, and shared secret keys.

In today's increasingly wireless world, memory limitations are not the only concern related to the storage of client state information. A wireless client may roam from one location to another. As a wireless client leaves one location and enters another, the wireless client may seek to access the same private network through a different server. If the server through which the client seeks access does not have the client's state information, then the server will not be able to grant the client access to the network.

One possible approach to solving the problem described above might be to manage a set of servers in such a way that client state information stored on one server is replicated on every server in a domain. However, where there are many clients and many servers, replicating all client state information on every server is a daunting task, especially if new clients are continuously added to the client pool. If each server in a domain needs to be equipped with a very large amount of memory to store all of the client state information for all of the clients, then the expense to the administrators of the domain may be unbearable. Indeed, if the number of clients increases at a sufficiently rapid pace, the administrators may find it impossible to keep up with the growth.

BRIEF DESCRIPTION OF THE DRAWINGS

The present invention is illustrated by way of example, and not by way of limitation, in the figures of the accompanying drawings and in which like reference numerals refer to similar elements and in which:

FIGS. 3A and 3B are flow diagrams that illustrates one embodiment of a method for avoiding the storage of client authorization characteristics on a server;

FIGS. 4A and 4B are flow diagrams that illustrate one embodiment of a method for replacing encrypted client state information that is stored on a client;

FIGS. 5A and 5B are flow diagrams that illustrate one embodiment of a method for amending encrypted client state information that is stored on a client;

FIGS. 7A and 7B are flow diagrams that illustrate one embodiment of a method for avoiding the storage of shared secret keys on a server;

FIG. 8 is a flow diagram that illustrates one embodiment of a method for sharing encrypted client state information among multiple servers;

FIG. 9 is a flow diagram that illustrates one embodiment of a method whereby a client may communicate the client's PAC Opaque to a server.

DETAILED DESCRIPTION OF THE PREFERRED EMBODIMENT

Figure 1:
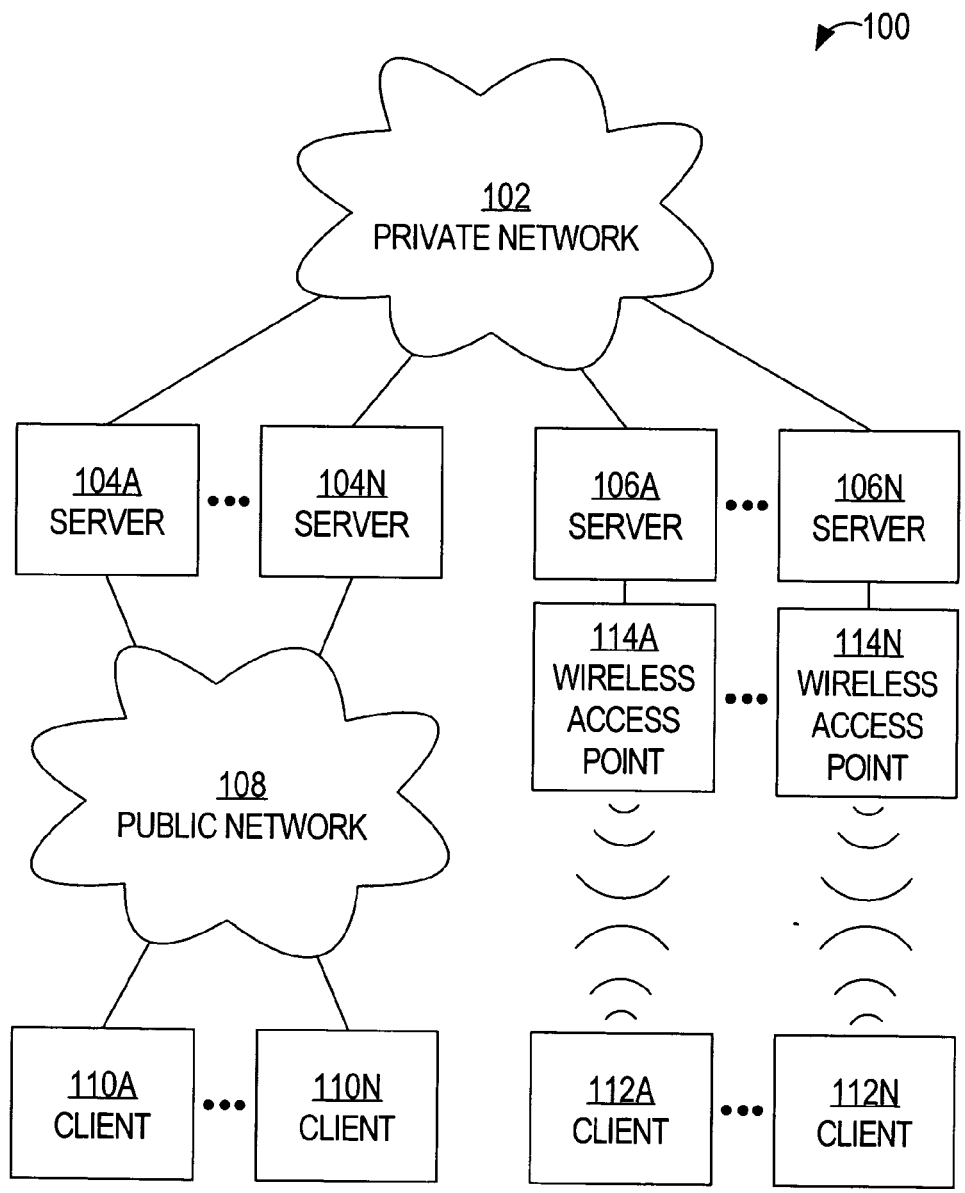
FIG. 1 is a block diagram that illustrates an overview of a system in which client state information is stored mainly on a client instead of a server.

A method and apparatus for avoiding the storage of client state on a server is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overview
3.0 Implementation Examples
   3.1 Avoiding the Storage of Authorization Characteristics On a Server
   3.2 Updating Encrypted Client State Information Stored On Clients
   3.3 Eliminating the Redundant Storage of Identical Client State Information
   3.4 Avoiding the Storage of Session State Information On an Intermediate Device
   3.5 Avoiding the Storage of Shared Secret Keys On a Server
   3.6 Sharing Client State Information Among Multiple Servers
   3.7 Avoiding Server Storage of Client State Information Using Transport Layer Security Protocol (TLS) Extensions
      3.7.1 Overview of EAP-FAST
      3.7.2 Tunnel Establishment Phase
4.0 Implementation Mechanisms—Hardware Overview
5.0 Extensions and Alternatives 1.0 General Overview The needs identified in the foregoing Background, and other needs and objects that will become apparent for the following description, are achieved in the present invention, which comprises, in one aspect, a method for avoiding the storage of client state on a server. Based on a local key that is not known to a client, a server encrypts the client's state information. The client's state information may include, for example, the client's authentication credentials, the client's authorization characteristics, and a secret key shared between the server and that client so that the client and server can mutually derive fresh session keys.

By any of a variety of mechanisms, the encrypted client state information is provided to the client. For example, the server may send the encrypted state information to the client over a network. Because the client does not have the local key, the client cannot decrypt the encrypted state information. The encrypted information is, therefore, "opaque" to the client. This opacity prevents the client from altering the client's authorization characteristics, for example.

The client stores the client's encrypted state information. After the client has stored the encrypted client state information, the server no longer needs to store the client's state information. Therefore, the server may free memory that stored the client's state information. The server may use the memory for other purposes.

When the server needs the client's state information—for example, to derive session keys or to determine a client's authorization characteristics—the server may request the client's encrypted state information from the client. In response to the server's request, the client may send, to the server, the encrypted state information that the client stored before. Alternatively, the client may send the client's encrypted state information to the server when the client initiates communication with the server, even in the absence of a request from the server.

After receiving the encrypted client state information from the client, the server decrypts the client state information using the local server key. After the server has decrypted the client state information, the server may use the client state information for whatever purposes the server would normally use the client state information. When the server is finished with the client state information, the server may, once again, free the memory that stored the client state information. Because each client stores that client's own state information in encrypted form, the server does not need to store any client's state information permanently.

In other aspects, the invention encompasses a computer apparatus and a computer-readable medium configured to carry out the foregoing steps.

2.0 Structural and Functional Overview

FIG. 1 is a block diagram that illustrates an overview of a system 100 in which client state information is stored mainly on a client instead of a server. System 100 comprises a private network 102, servers 104A-N, servers 106A-N, a public network 108, clients 110A-N, and clients 112A-N. Private network 102 may be a computer network such as a local area network (LAN) or a wide area network (WAN). Access to private network 102 from outside private network 102 is obtained only through servers 104A-N and servers 106A-N.

Servers 104A-N and servers 106A-N may be computers or network elements such as network routers, network switches, or network bridges that act as authentication, authorization and accounting servers (i.e., AAA servers). Servers 104A-N are coupled communicatively to private network 102. Servers 104A-N also may be coupled communicatively to public network 108. Public network 108 may be a computer network such as a LAN or a WAN. Public network 108 may comprise the Internet. Public network 108 may be a network that is not trusted by servers 104A-N or clients 110A-N. Alternatively, one or more of servers 104A-N may be coupled directly to one or more of clients 110A-N.

Servers 106A-N are coupled communicatively to private network 102. Servers 106A-N may communicate through a wireless medium with clients 112A-N. The wireless medium employs wireless access points (WAPs) 114A-N that are connected to servers 106A-N; the WAPs provide the wireless network access to clients 112A-N. Similarly, clients 112A-N may communicate through a wireless medium, including WAPs 114A-N, with servers 106A-N.

Clients 110A-N and clients 112A-N may be personal computers or diskless workstations. Clients 110A-N and clients 112A-N may be mobile devices such as laptop computers. Clients 110A-N may be coupled communicatively to public network 108. Alternatively, one or more of clients 110A-N may be coupled directly to one or more of servers 104A-N.

Each of clients 110A-N and clients 112A-N corresponds to different client state information. A client's state information may include, for example, the client's authentication credentials, the client's authorization characteristics, and a shared secret key that both the client and server mutually use to derive fresh session keys. A client's authentication credentials may indicate the client's unique identity. A client's authentication credentials may comprise a username and a password. A client's authorization characteristics may indicate the resources that the client is allowed to access within private network 102. A client's authorization characteristics may indicate the operations that the client is allowed to perform relative to resources within private network 102.

Servers 104A-N and servers 106A-N each store a local key that is not known to any of clients 110A-N and clients 112A-N. In one embodiment, each server's local key is different from every other server's local key. In another embodiment, each server's local key is the same. Using their local keys, servers 104A-N and servers 106A-N encrypt client state information that corresponds to clients 110A-N and clients 112A-N. By any of a variety of mechanisms, each client's encrypted client state information is provided to that client.

Each of clients 110A-N and clients 112A-N stores that client's encrypted state information. In one embodiment, clients 110A-N and clients 112A-N establish associations between encrypted client state information and the servers that encrypted that client state information. For example, both server 104A and server 104B may encrypt the client state information of client 110A. Client 110A may store, separately, the encrypted client state information that was encrypted by server 104A, and the encrypted client state information that was encrypted by server 104B. Client 110A may establish, separately, an association between server 104A and the encrypted state information that was encrypted by server 104A, and an association between server 104B and the encrypted state information that was encrypted by server 104B.

Because clients 110A-N and clients 112A-N store encrypted client state information, servers 104A-N and servers 106A-N do not need to store client state information permanently. Servers 104A-N and servers 106A-N may free, for other purposes, memory that stored client state information.

When any one of servers 104A-N or servers 106A-N needs the client state information of any one of clients 110A-N or clients 112A-N, the server may request the client's encrypted state information from the client. When any one of clients 110A-N or clients 112A-N receives such a request, the client may send, to the server, the encrypted state information that is associated with the server. Alternatively, any one of clients 110A-N or clients 112A-N may send the client's encrypted state information to a server when the client initiates communication with the server, even in the absence of a request from the server.

When any one of servers 104A-N or servers 106A-N receives encrypted client state information from a client, the server decrypts the client state information using the server's local key. After the server has decrypted the client state information, the server may use the client state information for whatever purposes the server would normally use the client state information. When the server is finished with the client state information, the server may free the memory that stored the client state information. Thus, with a relatively small amount of memory, servers 104A-N and servers 106A-N may perform authentication and authorization functions even when there are many different clients.

Figure 2:
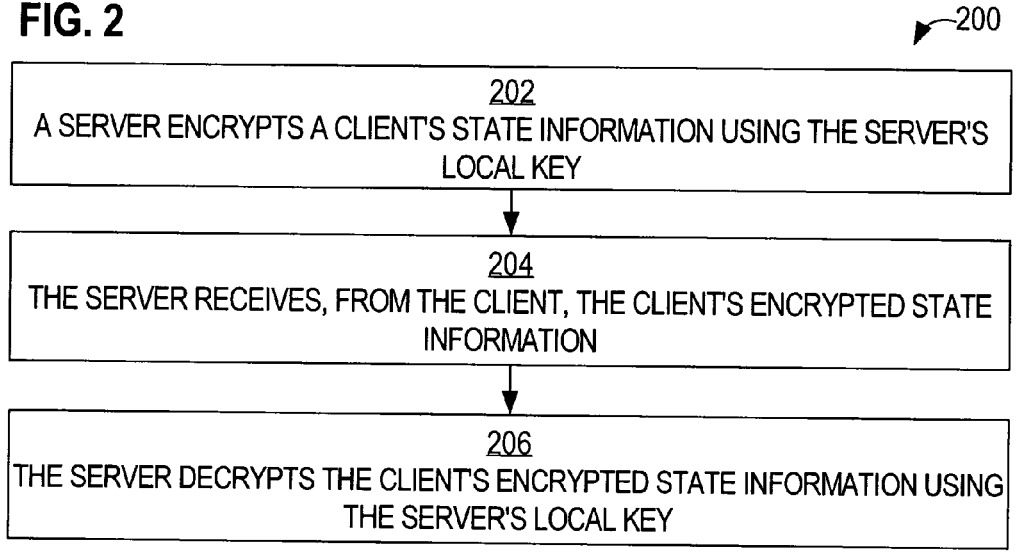
FIG. 2 is a flow diagram that illustrates a high level overview of one embodiment of a method for avoiding the storage of client state information on a server.

FIG. 2 is a flow diagram 200 that illustrates a high level overview of one embodiment of a method for avoiding the storage of client state information on a server. In block 202, a server encrypts a client's state information using the server's local key. The client does not have access to the server's local key. For example, server 104A may encrypt the client state information of client 110A using the local key of server 104A. Additionally, server 104A may encrypt the client state information of client 110B using the local key of server 104A.

The encrypted client state information of clients 110A and 110B may be provided to clients 110A and 110B, respectively. Upon receiving encrypted client state information, clients 110A and 110B may store the encrypted client state information.

In block 204, the server receives, from the client, the client's encrypted state information. Continuing the example, server 104A may receive, from client 110A, the encrypted client state information of client 110A. Additionally, server 104A may receive, from client 110B, the encrypted client state information of client 110B.

In block 206, the server decrypts the client's encrypted state information using the server's local key. Continuing the example, using the local key of server 104A, server 104A may decrypt the encrypted client state information received from client 110A. Additionally, using the local key of server 104A, server 104A may decrypt the encrypted client state information received from client 110B. Server 104A may use the decrypted client state information of clients 110A and 110B in the same manner that server 104A would have used the client state information if server 104A had stored the client state information locally and continuously. However, server 104A does not need to store any client state information on a continuous basis.

Detailed example implementations of the foregoing general approach are described below.

3.0 Implementation Examples 3.1 Avoiding the Storage of Authorization Characteristics on a Server According to one embodiment, whenever any one of clients 110A-N or clients 112A-N sends a request to any one of servers 104A-N or servers 106A-N, the client sends the client's encrypted state information to the server along with the request. The server may determine, from authorization characteristics included in the client's encrypted state information, whether the client's request should be satisfied or denied. Each of clients 110A-N and clients 112A-N may be associated with different authorization characteristics.

FIGS. 3A and 3B depict a flow diagram 300 that illustrates one embodiment of a method for avoiding the storage of client authorization characteristics on a server. In one embodiment, each of servers 104A-N and servers 106A-N stores a different set of local keys. A server may encrypt client state information using any local key in the server's set of local keys. By using different local keys at different times, security is increased. Each local key is associated with a different index value that is a subfield content from a general field called a Security Parameter Index (SPI). In block 302, a server selects a particular local key from among the server's set of local keys. For example, the server may be one of servers 104A-N or servers 106A-N.

In block 304, the server calculates an authentication code based on both a client's encrypted state information and the particular local key. The client's state information includes the client's authorization characteristics. The client's state information also indicates the client's unique identity. The authentication code is a function of a combination of the server's identity, the client's encrypted state information and the particular local key. The function is typically a one-way hash function that prevents an adversary from discerning the original text protected by the function.

In block 306, using the particular local key, the server encrypts a combination of the client's state information, and a lifetime value. The lifetime value indicates a future time at which the server should deem the client's state information to be expired. The lifetime value may be an absolute date or it may be calculated, for example, by adding a constant value to the current value of the server's clock. The result of the encryption together with the authentication code is referred to herein as the encrypted information.

In block 308, the server sends, to the client, both the encrypted information, the server's identity, and the SPI that is associated with the particular local key. For example, the client may be one of clients 110A-N or clients 112A-N. The client stores the encrypted information, the server's identity, and the SPI, and establishes associations between the server and the encrypted information, and between the encrypted information and the SPI corresponding to the particular server. After the client has stored this information, the server may free the server's memory that stored the client's state information, both in plain and in encrypted forms.

Thereafter, when the client sends a request to the server, the client also sends the encrypted information that is associated with the server, and the SPI that is associated with both the server and the encrypted information. In block 310, the server receives, from the client, the encrypted information, the server's identity, the SPI, and a request.

In block 312, the server verifies the server's identity provided by the client and, using the local key that is associated with the SPI, extracts the authentication code and decrypts the encrypted information that was received from the client. The result of the decryption along with the authentication code is referred to herein as the decrypted information.

The decrypted information contains at least an authentication code, client state information, and a lifetime value. In block 314, the server calculates a new authentication code using the same function that the server used in block 304. The new authentication code is a function of a combination of the particular local key, the server's identity, and the encrypted client state information that is contained in the decrypted information.

In block 316, the server determines whether the new authentication code matches the authentication code that is contained in the decrypted information. If the authentication codes match, then control passes to block 318. If the authentication codes do not match, then control passes to block 324. In this manner, the server authenticates the information contained in the decrypted information.

In block 318, by comparing a current time value to the lifetime value contained in the decrypted information, the server determines whether the client state information contained in the decrypted information has expired. If the current time value is less than the lifetime value contained in the decrypted information, then control passes to block 320. If the current time value is not less than the lifetime value contained in the decrypted information, then control passes to block 324.

In block 320, the server determines, based on authorization characteristics that are contained in the decrypted information, whether the request received in block 310 is authorized. If the request is authorized, then control passes to block 322. If the request is not authorized, then control passes to block 324.

In block 322, the server satisfies the request.

Alternatively, in block 324, the server denies the request.

After the server has either satisfied or denied the request, the server may free the server's memory that stored the client's state information, both in plain and in encrypted forms. Thus, the server may avoid storing client state information, including authorization characteristics, on more than a merely temporary, non-continuous basis.

3.2 Updating Encrypted client State Information Stored on Clients

In one embodiment, each of clients 110A-N and clients 112A-N is configured to obey the following rules regarding encrypted client state information. When a client receives encrypted client state information from a server, the client stores the encrypted client state information. For example, the client may store the value in the client's random access memory (RAM) and/or on the client's hard disk drive.

When a client receives updated encrypted client state information from a server, the client stores the updated encrypted client state information. The client may replace previously stored encrypted client state information that is associated with the server with encrypted client state information later received from the server. This rule permits a server to change a client's authorization characteristics, refresh the secret key used by the client and server to derive fresh session keys, or update any relevant client state information.

When a client receives additional encrypted client state information from a server, the client appends the additional encrypted client state information to the previously stored encrypted client state information that is associated with the server. This rule permits a server to add authorization characteristics to a client's existing authorization characteristics without requiring the client to send the previously stored encrypted client state information to the server.

In one embodiment, a server indicates to a client whether the client should replace currently stored encrypted client state information with newly received encrypted client state information, or append newly received encrypted client state information to currently stored encrypted client state information.

FIGS. 4A and 4B depict a flow diagram 400 that illustrates one embodiment of a method for replacing encrypted client state information that is stored on a client. In block

402, using a local key, a server encrypts a client's state information. For example, the server may be one of servers 104A-N or servers 106A-N. The result of the encryption is referred to below as the first encrypted information.

In block 404, the server sends the first encrypted information to the client. For example, the client may be one of clients 110A-N or clients 112A-N. The client stores the first encrypted information, and establishes an association between the server and itself.

The client sends, to the server, both a first request and the first encrypted information. In block 406, the server receives, from the client, both the first request and the first encrypted information.

In block 408, using the local key, the server decrypts the encrypted information that was received from the client in block 406 and validates the authentication code. The result of the decryption is referred to below as the first decrypted information.

In block 410, the server determines, based on authorization characteristics that are contained in the first decrypted information, whether the first request is authorized. If the first request is authorized, then control passes to block 412. If the first request is not authorized, then control passes to block 414.

In block 412, the server satisfies the first request. Control passes to block 416.

Alternatively, in block 414, the server denies the first request. The server may deny all subsequent requests from the client.

In block 416, using the local key, the server encrypts updated client state information for the client. The result of the encryption is referred to below as the second encrypted information.

In block 418, the server sends the second encrypted information to the client. The client stores the second encrypted information, establishes an association between the server and itself, and updates its state with the second encrypted information. The client's receipt of the second encrypted information renders the first encrypted information invalid. The client may replace the first encrypted information with the second encrypted information.

The client sends, to the server, both a second request and the second encrypted information. In block 420, the server receives, from the client, both the second request and the second encrypted information.

In block 422, using the local key, the server decrypts the encrypted information that was received from the client in block 420 and validates the authentication code. The result of the decryption is referred to below as the second decrypted information.

In block 424, the server determines, based on authorization characteristics that are contained in the second decrypted information, whether the second request is authorized. If the second request is authorized, then control passes to block 426. If the second request is not authorized, then control passes to block 428.

In block 426, the server satisfies the second request.

Alternatively, in block 428, the server denies the second request. The server may deny all subsequent requests from the client.

FIGS. 5A and 5B depict a flow diagram 500 that illustrates one embodiment of a method for amending encrypted client state information that is stored on a client. In block 502, using a local key, a server encrypts a client's state information. For example, the server may be one of servers 104A-N or servers 106A-N. The result of the encryption is referred to below as the first encrypted information.

In block 504, the server sends the first encrypted information to the client. For example, the client may be one of clients 110A-N or clients 112A-N. The client stores the first encrypted information, and establishes an association between the server and the first encrypted information.

The client sends, to the server, both a first request and the first encrypted information. In block 506, the server receives, from the client, both the first request and the first encrypted information.

In block 508, using the local key, the server decrypts the encrypted information that was received from the client in block 506 and validates the authentication code. The result of the decryption is referred to below as the first decrypted information.

In block 510, the server determines, based on authorization characteristics that are contained in the first decrypted information, whether the first request is authorized. If the first request is authorized, then control passes to block 512. If the first request is not authorized, then control passes to block 514.

In block 512, the server satisfies the first request. Control passes to block 516.

Alternatively, in block 514, the server denies the first request. The server may deny all subsequent requests from the client.

In block 516, using the local key, the server encrypts additional client state information for the client. The result of the encryption is referred to below as the second encrypted information.

In block 518, the server sends the second encrypted information to the client. The client stores the second encrypted information, and establishes an association between the server and itself, storing the second encryption information along with the first encryption information. The client's receipt of the second encrypted information does not render the first encrypted information invalid. The client does not replace the first encrypted information with the second encrypted information.

The client sends, to the server, a second request, the first encrypted information, and the second encrypted information. In block 520, the server receives, from the client, the second request, the first encrypted information, and the second encrypted information.

In block 522, using the local key, the server decrypts the first encrypted information that was received from the client in block 520. The result of the decryption is referred to below as the second decrypted information.

In block 524, using the local key, the server decrypts the second encrypted information that was received from the client in block 520. The result of the decryption is referred to below as the third decrypted information.

In block 526, the server determines, based on valid authentication codes in the second and third authentication values, authorization characteristics that are contained in the second decrypted information, and authorization characteristics that are contained in the third decrypted information, whether the second request is authorized. If the second request is authorized, then control passes to block 528. If the second request is not authorized, then control passes to block 530.

In block 528, the server satisfies the second request.

Alternatively, in block 530, the server denies the second request. The server may deny all subsequent requests from the client.

Using the approaches described above, a server may issue new authorization characteristics to a client or revoke a client's existing authorization characteristics.

The approach described above with reference to flow diagram 500 may be used relative to multiple ones of clients 110A-N and clients 112A-N. Each of a plurality of clients may send, to a given server, encrypted information that contains authorization characteristics for that client. Each client's authorization characteristics may differ from each other client's authorization characteristics.

3.3 Eliminating the Redundant Storage of Identical Client State Information

In one embodiment, multiple servers may provide authentication and authorization services to a client. If each server issued separate encrypted state information to a client, then the client might store multiple copies of the same client state information; each copy encrypted under a different server's local key. If the client state information is large, then this redundancy wastes significant storage resources of the client.

To avoid this redundant storage of identical client state information, client state information can be encrypted using a general server key that is accessible to all of the servers but none of the clients. Each server may encrypt the general server key using that server's local key. When a server sends encrypted client state information to a client, the server also sends the general server key that has been encrypted using the server's local key. The client may store multiple encrypted general server keys (one for each server) and just one copy of the encrypted client state information. For each server, the client may establish an association between the server, that server's encrypted general server key, and the encrypted client state information. Because each encrypted general server key is substantially smaller than the encrypted client state information, this storage approach preserves the client's storage resources.

When a client sends a request to a server, the client also sends the encrypted general server key that is associated with that server, and the encrypted client state information that is associated with the encrypted general server key. A server that receives the encrypted general server key can decrypt the encrypted general server key to obtain the decrypted general server key. Using the decrypted general server key, the server can decrypt the encrypted client state information.

Figure 6:
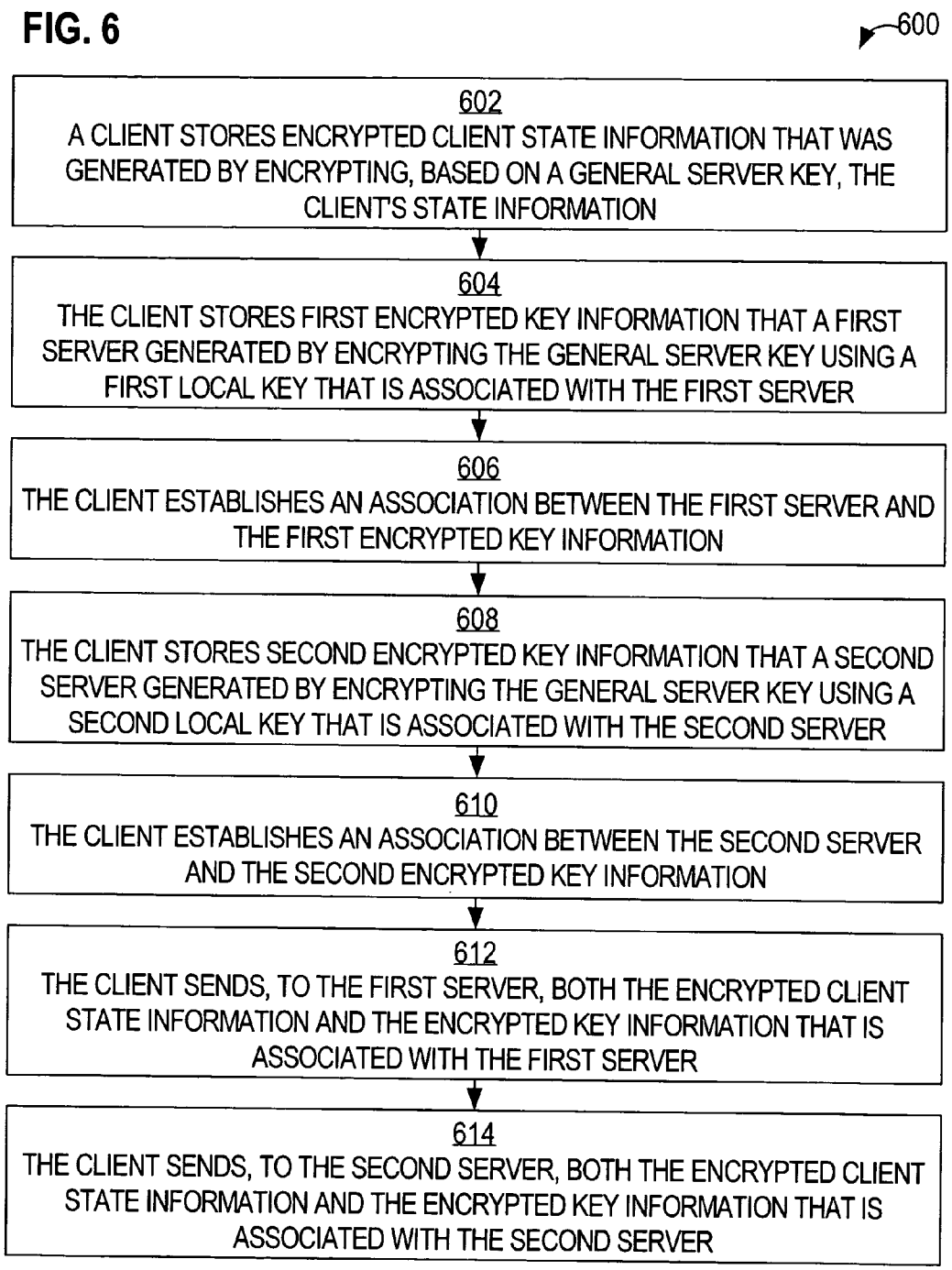
FIG. 6 is a flow diagram that illustrates one embodiment of a method for eliminating the redundant storage of identical client state information.

FIG. 6 is a flow diagram 600 that illustrates one embodiment of a method for eliminating the redundant storage of identical client state information. In block 602, a client stores encrypted client state information that was generated by encrypting, based on a general server key, the client's state information. For example, client 110A may store encrypted client state information that server 104A encrypted using a general server key that is not accessible to client 110A.

In block 604, the client stores first encrypted key information that a first server generated by encrypting the general server key using a first local key that is associated with the first server. Continuing the example, using a local key of server 104A, server 104A may encrypt the general server key to produce first encrypted key information. Server 104A may send the first encrypted key information to client 110A. Client 110A may receive the first encrypted key information and store the first encrypted key information.

In block 606, the client establishes an association between the first server and the first encrypted key information. Continuing the example, client 110A may establish an association between the first encrypted key information and server 104A.

In block 608, the client stores second encrypted key information that a second server generated by encrypting the general server key using a second local key that is associated with the second server. Continuing the example, using a local key of server 104B, server 104B may encrypt the general server key to produce second encrypted key information. Server 104B may send the second encrypted key information to client 110A. Client 110A may receive the second encrypted key information and store the second encrypted key information.

In block 610, the client establishes an association between the second server and the second encrypted key information. Continuing the example, client 110A may establish an association between the second encrypted key information and server 104B.

The first local key may differ from the second local key. The first local key may be inaccessible to all except the first server. The second local key may be inaccessible to all except the second server. Thus, in the example above, server 104A may be incapable of decrypting the second encrypted key information, and server 104B may be incapable of decrypting the first encrypted key information.

In block 612, the client sends, to the first server, both the encrypted client state information and the encrypted key information that is associated with the first server. Continuing the example, client 110A may send the encrypted client state information and the first encrypted key information to server 104A. Using the local key of server 104A, server 104A may decrypt the first encrypted key information to obtain the general server key. Using the general server key, server 104A may decrypt the encrypted client state information.

In block 614, the client sends, to the second server, both the encrypted client state information and the encrypted key information that is associated with the second server. Continuing the example, client 110A may send the encrypted client state information and the second encrypted key information to server 104B. Using the local key of server 104B, server 104B may decrypt the first encrypted key information to obtain the general server key. Using the general server key, server 104B may decrypt the encrypted client state information.

As a result, in the example above, client 110A may store just one copy of the encrypted client state information pertaining to client 110A. This conserves the storage resources of client 110A.

3.4 Avoiding the Storage of Session State Information on an Intermediate Device The approaches described above may be adapted to avoid the storage of session state information on intermediate devices. One such type of intermediate device is called a "responder." A responder is a device that responds to a first device's request to participate in a session with a second device.

One example of a responder is the "introducer device" described in co-pending U.S. application Ser. No. 10/411, 964, entitled "METHOD AND APPARATUS FOR SECURELY EXCHANGING CRYPTOGRAPHIC IDENTITIES THROUGH A MUTUALLY TRUSTED INTERMEDIARY". As described in that application, the introducer device facilitates the secure exchange of cryptographic identities between a "petitioner device" and an "authority device," both of which already trust the introducer device.

If a responder is required to store session state information, then the responder may be exposed to denial-of-service attacks. To avoid storing session state information on a responder, session state information may be encrypted. The responder may forward the encrypted session state information along with other information that the first and second devices send to each other through the responder. The first and second devices may send the encrypted session state information to the responder along with other information that the responder is expected to process. The first and second devices may return, to the responder, whatever encrypted session state information the first and second devices receive from the responder. Thus, the encrypted session state information may be called an "echo." When the responder receives an echo, the responder may check the protections on the echo.

The echo may include a lifetime value that indicates when an associated session has expired. The responder may compare the lifetime value with the current value of the responder's clock to determine whether the session has expired.

When using a cryptographic protocol, a responder may issue a random nonce, and then store the nonce for use in processing messages that the responder will receive in the future. For example, a responder may issue a random nonce when participating in a challenge/response protocol. In order to avoid storing the nonce on the responder, the nonce may be included in an echo. Other information, such as identifiers, network addresses, and data for selecting protocol options, also may be included in the echo.

3.5 Avoiding the Storage of Shared Secret Keys on a Server

Each of clients 110A-N and clients 112A-N may be associated to the server with a different shared secret key. Clients 110A-N and clients 112A-N may use their shared secret keys with servers 104A-N and 106-N to mutually derive session keys that the clients may use to encrypt and decrypt messages that the clients send to and receive from servers 104A-N and servers 106A-N. In this manner, a secure "tunnel" may be established between clients and server. However, in order for servers 104A-N and servers 106A-N to establish these secure tunnels, servers 104A-N and servers 104A-N also need to have access to the shared secret keys so that the servers also can derive the session keys. When there are many clients, storing a different shared secret key for each separate client can require amounts of memory that no network element realistically may possess.

Therefore, according to one embodiment, when any one of clients 110A-N or clients 112A-N initiates communication with any one of servers 104A-N or servers 106A-N, the server instructs the client to send the client's encrypted state information to the server. In response, the client sends the client's encrypted state information to the server. The client's encrypted state information contains the client's shared secret key.

The server may use the server's local key to decrypt the client's encrypted state information and validate the authentication code, thereby obtaining the client's shared secret key. The server may derive one or more session keys from the client's shared secret key. Using the one or more session keys, the server may encrypt and decrypt messages sent to and received from the client. When the server has finished communicating with the client, the server may free, for other purposes, the server's memory that was used to store the client's shared secret key and any corresponding session keys. Therefore, the server is not required to concurrently store different shared secret keys for every client that has access private network 102.

FIGS. 7A and 7B depict a flow diagram 700 that illustrates one embodiment of a method for avoiding the storage of shared secret keys on a server. In one embodiment, each of servers 104A-N and servers 106A-N stores a different set of local keys. A server may encrypt client state information using any local key in the server's set of local keys. By using different local keys at different times, security is increased. Each local key is associated with a different SPI. In block 702, a server selects a particular local key from among the server's set of local keys. For example, the server may be one of servers 104A-N or servers 106A-N.

In block 704, the server calculates an authentication code based on the server's identity, a client's encrypted state information, and the particular local key. The client's state information includes the client's shared secret key. The client's state information also indicates the client's unique identity. The authentication code is a function of a combination of the server's identity, the client's encrypted state information, and the particular local key. The function may be implemented as a one-way hash function to prevent an adversary from discerning the original text protected by the function.

In block 706, using the particular local key, the server encrypts a combination of the client's state information, and a lifetime value. The lifetime value indicates a future time at which the server should deem the client's state information to be expired. The time value may be an absolute time or a value calculated, for example, by adding a constant value to the current value of the server's clock. The result of the authentication code and encryption is referred to herein as the encrypted information.

In block 708, the server sends, to the client, both the encrypted information and the server's identity, along with the SPI that is associated with the particular local key. For example, the client may be one of clients 110A-N or clients 112A-N. The client stores the encrypted information and the SPI for the specified server, and establishes associations between itself and the server using the encrypted information. After the client has stored this information, the server may free the server's memory that stored the client's state information, both in plain and in encrypted forms.

When the client initiates communication with the server, the server may instruct the client to send the encrypted information to the server. In response, the client may send both the encrypted information and the associated SPI to the server. In block 710, the server receives, from the client, both encrypted information and the SPI.

In block 712, using the local key that is associated with the SPI, the server decrypts the encrypted information that was received from the client and validates the authentication code. The result of the decryption is referred to herein as the decrypted information.

The decrypted information contains at least an authentication code, client state information, and a lifetime value. In block 714, the server calculates a new authentication code using the same function that the server used in block 704. The new authentication code is a function of a combination of the particular local key and the client encrypted state information that is contained in the decrypted information.

In block 716, the server determines whether the new authentication code matches the authentication code that is contained in the decrypted information. If the authentication codes match, then control passes to block 718. If the authentication codes do not match, then control passes to block 720. In this manner, the server authenticates the information contained in the decrypted information.

In block 718, by comparing a current time value to the lifetime value contained in the decrypted information, the server determines whether the client state information contained in the decrypted information has expired. If the current time value is less than the lifetime value contained in the decrypted information, then control passes to block 722. If the current time value is not less than the lifetime value contained in the decrypted information, then control passes to block 724.

In block 720, the server rejects the encrypted information that was received from the client. The server may reject all subsequent data sent from the client.

The client may derive one or more session keys from the shared secret key. Using such a session key, the client may encrypt a message and send the encrypted message to the server. In block 722, the server receives, from the client, a message that has been encrypted using a derived key that was derived from the shared secret key.

The client state information that is contained in the decrypted information includes the shared secret key. In block 724, the server derives, from the shared secret key, one or more session keys.

In block 726, using such a session key, the server decrypts the encrypted message that was sent from the client. Using a session key derived from the shared secret key, the server may encrypt another message and send that encrypted message back to the client. Thus, using the session keys derived from the shared secret key, the client and the server may encrypt and decrypt messages that they communicate to each other, thereby establishing a secure "tunnel."

After the client and the server are finished communicating, the server may free the server's memory that stored the client's state information, both in plain and in encrypted forms. Thus, the server may avoid storing client state information, including shared secret keys, on more than a merely temporary, non-continuous basis.

The approach described above with reference to flow diagram 700 may be used relative to multiple ones of clients 110A-N and clients 112A-N. Each of a plurality of clients may send, to a given server, encrypted information that contains a shared secret key for that client. Each client's shared secret key differs from each other client's shared secret key.

3.6 Sharing Client State Information Among Multiple Servers

As is described above, a wireless client, such as client 112A, may roam from one location to another. As a wireless client leaves one location and enters another, the wireless client may seek to access the same private network through a different server. For example, in one location, client 112A may access private network 102 through server 106A. If server 106A has the shared secret key of client 112A, then server 106A can communicate with client 112A through a secure tunnel. However, if client 112A moves to an area that is serviced by server 106B rather than server 106A, then client 112A may seek to access private network 102 through server 106B rather than server 106A. Under prior approaches, server 106B might not have the shared secret key of client 112A. In that case, server 106B would not be able to communicate with client 112A through a secure tunnel.

Fortunately, according to one embodiment, multiple servers may store the same local key. When a group of servers has access to the same local key, then each server in the group can decrypt encrypted information that contains a client's state information—including the client's shared secret key—provided that the client's state information was encrypted using the local key.

For example, according to one embodiment, all of servers 106A-N may store the same local key or set of local keys. Server 106A may encrypt the client state information of client 112A using such a local key and then send the encrypted client state information to client 112A. Client 112A may store the encrypted client state information. Whenever client 112A needs to communicate with any of servers 106A-N, client 112A may send the same encrypted client state information to that server. Because all of servers 106A-N have access to the local key that was used to encrypt the encrypted client state information, any of servers 106A-N may decrypt received encrypted client state information using the local key. Thus, any of servers 106A-N may obtain the shared secret key of client 112A and establish a secure tunnel with client 112A.

When a new server is added to servers 106A-N, the new server does not need, at that time, to be supplied with the shared secret keys of every client in system 100. Instead, the new server may be supplied with the local key or set of local keys. Thereafter, the new server can obtain encrypted client state information on an as-needed basis from clients that initiate communication with the new server. Because each client stores its own encrypted client state information, no server needs to continue to store any client's state information after the client and the server have finished communicating with each other.

FIG. 8 is a flow diagram 800 that illustrates one embodiment of a method for sharing encrypted client state information among multiple servers. In block 802, a client stores encrypted client state information was generated by encrypting, using a local key, client state information that includes a shared secret key. For example, client 112A may store encrypted client state information that was encrypted using a local key that is accessible to each of servers 106A-N but not client 112A. The encrypted client state information may include the shared secret key of client 112A.

In block 804, the client sends the encrypted client state information to a first server that stores the local key. Continuing the example, client 112A may send the encrypted client state information to server 106A. Server 106A may decrypt the encrypted client state information using the local key, and derive one or more session keys from the shared secret key contained in the client state information. Server 106A may encrypt a message using such a session key and send the encrypted message to client 112A. Client 112A may receive the encrypted message from server 106A. Client 112A may derive the same session key from the same shared secret key and decrypt the encrypted message.

In block 806, the client sends the encrypted client state information to a second server that stores the local key. Continuing the example, client 112A may send the encrypted client state information to server 106B. Server 106B may decrypt the encrypted client state information using the local key, and derive one or more session keys from the shared secret key contained in the client state information. Server 106B may encrypt a message using such a session key and send the encrypted message to client 112A. Client 112A may receive the encrypted message from server 106B. Client 112A may derive the same session key from the same shared secret key and decrypt the encrypted message.

Thus, in the example above, all of servers 106A-N may establish secure communication tunnels with client 112A. The example above is applicable to any of clients 112A-N.

3.7 Avoiding Server Storage of Client State Information Using Transport Layer Security (TLS) Protocol Extensions The Transport Security Layer (TLS) Protocol is described in Internet Engineering Task Force (IETF) Request For Comments (RFC) 2245. Extensions to the TLS Protocol are described in IETF RFC 3546. As is described below, TLS Protocol Extensions may be used to avoid the storage of client state information on a server. Additionally, the approach described below eliminates the need for public key authentication mechanisms. According to one embodiment, the TLS Protocol may be used to cryptographically protect Extensible Authentication Protocol (EAP) connections between a client and multiple servers. EAP is described in IETF RFC 2284.

3.7.1 Overview of EAP-FAST

According to one embodiment, an extensible framework is provided to allow clients and servers to communicate with each other securely. The extensible framework is referred to herein as "EAP-FAST." EAP-FAST achieves mutual authentication by using a shared secret key to establish a secure tunnel. The tunnel may be used to protect relatively weak authentication techniques, such as those based on passwords. The shared secret key may be called a "Protected Access Credential" Key (PAC Key). The PAC Key may be used to mutually authenticate the client and the server that establish the secure tunnel.

EAP-FAST comprises three phases: the provisioning phase, the tunnel establishment phase, and the authentication phase. Each phase is discussed below.

In the provisioning phase, a server encrypts a PAC Key using a local key that is not accessible to the client. The resulting encrypted information may be referred to as the "PAC Opaque" because the client, lacking the local key, cannot decrypt the encrypted information. Both the PAC Key and the PAC Opaque are included in a PAC. The PAC may include additional information, such as an identity of the server that generated the PAC Opaque and an SPI. The SPI may indicate which local key and which encryption algorithm was used to generate the PAC Opaque.

The client and the server participate in an authenticated key agreement in order to establish a protected tunnel. For example, the authenticated key agreement may follow the Diffie-Hellman key agreement protocol. The Diffie-Hellman key agreement protocol is described in "New Directions In Cryptography," by W. Diffie and M. E. Hellman, in *IEEE Transactions On Information Theory*, vol. 22, pages 644-654. The client authenticates itself to the server. After the client has authenticated itself to the server, the server sends the client's PAC to the client through the protected tunnel established as a result of the authenticated key agreement.

In alternative embodiments, the PAC may be provided to the client using other "out-of-band" mechanisms. For example, a user may obtain the PAC directly from a server or an information technology (IT) administrator and store the PAC on the client.

In the tunnel establishment phase, the client and the server authenticate each other using the PAC. The client sends the PAC Opaque to the server. Using the local key, the server decrypts the PAC Opaque to obtain the client's PAC Key. Using the PAC Key, the client and the server establish a tunnel key. The client and the server use the tunnel key to cryptographically protect messages sent between the client and the server. Messages that are protected by the tunnel key may be said to be within a tunnel session.

During the authentication phase, the client and the server participate in an authentication protocol within the tunnel session. The authentication protocol may further establish other keying material that is cryptographically bound to the tunnel session key to assure session integrity. During the authentication protocol, the client and the server may mutually derive one or more session keys. The client and the server may use these session keys to bind the authentication protocol conversation to the tunnel establishment conversation to ensure session integrity.

In EAP-FAST, information is communicated in packets, referred to herein as "EAP-FAST packets." EAP-FAST packets are encapsulated within EAP packets, which are carried by a carrier protocol such as the Remote Authentication Dial-In User Service (RADIUS) protocol and the Diameter protocol. EAP-FAST packets encapsulate TLS packets. The TLS packets encapsulate authentication information. Thus, EAP-FAST messaging uses a layered model, where each layer encapsulates the layer beneath it.

The TLS packets contain EAP-Type-Length-Value (TLV) objects. The EAP-TLV objects carry parameters between a client and a server.

3.7.2 Tunnel Establishment Phase

In one embodiment, in the tunnel establishment phase, the server and the client negotiate EAP parameters. The server may send an EAP-Request/Identity packet to the client, and the client may respond with an EAP-Response/Identity packet. The EAP-Response/Identity packet contains the client's associated username. The client may use an anonymous username to protect the client's identity.

After the server has received the client's identity and determined that EAP-FAST authentication is to occur, the EAP server sends, to the client, an EAP-FAST/Start packet. The EAP-FAST/Start packet is an EAP-Request packet with EAP-Type set to "EAP-FAST" and the Start bit set. The EAP-FAST/Start packet also includes a server identity that identifies the server to the client. The client receives the EAP-FAST/Start packet and, in response, sends an EAP-Response packet to the server. The EAP-Response packet has EAP-Type set to "EAP-FAST".

The data field of the EAP-Response packet contains an EAP-FAST encapsulated TLS ClientHello handshake message. The ClientHello message contains, in an extension data field of the message, the client's PAC Opaque. The ClientHello message also contains the client's random nonce. In one embodiment, the client may cache a different PAC Opaque for each different server with which the client communicates. Each PAC Opaque may be associated with a different server identity. From among multiple PAC Opaques, the client may select a PAC Opaque that is associated with the server identity contained in the EAP-FAST/Start packet, and send that PAC Opaque to the server in the extension data field of the ClientHello message.

The server receives the EAP-FAST packet that encapsulates the TLS ClientHello handshake message. The server obtains the PAC Opaque from the extension data field of the ClientHello message. The server decrypts the PAC Opaque using the local key that was used to encrypt the PAC Opaque. The server derives a tunnel key from the client's random nonce, a server random nonce, and shared secret key contained in the PAC Opaque. The server uses the tunnel key to compute a message digest that is embedded within a TLS Finished message.

In response to receiving the EAP-FAST packet from the client, the server sends, to the client, an EAP-Request packet with EAP-Type set to "EAP-FAST". The data field of the EAP-Request packet encapsulates at least a TLS ServerHello message and the TLS Finished message. The ServerHello message contains the server's random nonce used to derive the tunnel key: The TLS Finished message contains a message that has been protected according to the negotiated algorithm, keys, and secrets.

The client receives the EAP-Request packet that contains the TLS ServerHello message. The client derives the tunnel key from the shared secret key (i.e., PAC Key), the client's random nonce, and the server's random nonce contained in the ServerHello message. The client generates its message digest and embeds the value in a TLS Finished message. The client responds to the server with the TLS Finished message.

Afterwards, during the authentication phase, the client and the server may encrypt and decrypt messages using the tunnel session keys.

FIG. 9 is a flow diagram 900 that illustrates one embodiment of a method whereby a client may communicate the client's PAC Opaque to a server. In block 902, the server encrypts the client's state information using a local key that is not accessible to the client, thereby producing a PAC Opaque. The client's state information, e.g., PAC Opaque, includes a shared secret key.

The PAC Opaque may be stored on the client through any of a variety of mechanisms. In the course of initiating communication with the server, the client sends the PAC Opaque to the server. The PAC Opaque is contained in the extension data field of a TLS Handshake Protocol extended ClientHello message. In block 904, the server receives, from the client, a TLS Handshake Protocol extended ClientHello message that contains the PAC Opaque in the extended ClientHello message's extension data field.

In block 906, using the local key, the server decrypts the PAC Opaque that was received from the client, thereby obtaining the shared secret key. The client and the server may derive one or more keys from the shared secret key. The client and the server may encrypt and decrypt messages using such derived keys. Thus, using extensions to the TLS Handshake Protocol, the server can receive a client's state information and establish a secure communication channel with the client based on the client's state information. Because the client stores the client's state information, the server does not need to store the client's state information on a permanent or continuous basis. Because the client's state information is encrypted using a local key that is not accessible to the client, the client cannot modify the client's state information. The client's state information is as secure as if the client's state information was stored on the server instead of the client.

4.0 Implementation Mechanisms—Hardware Overview

Figure 10:
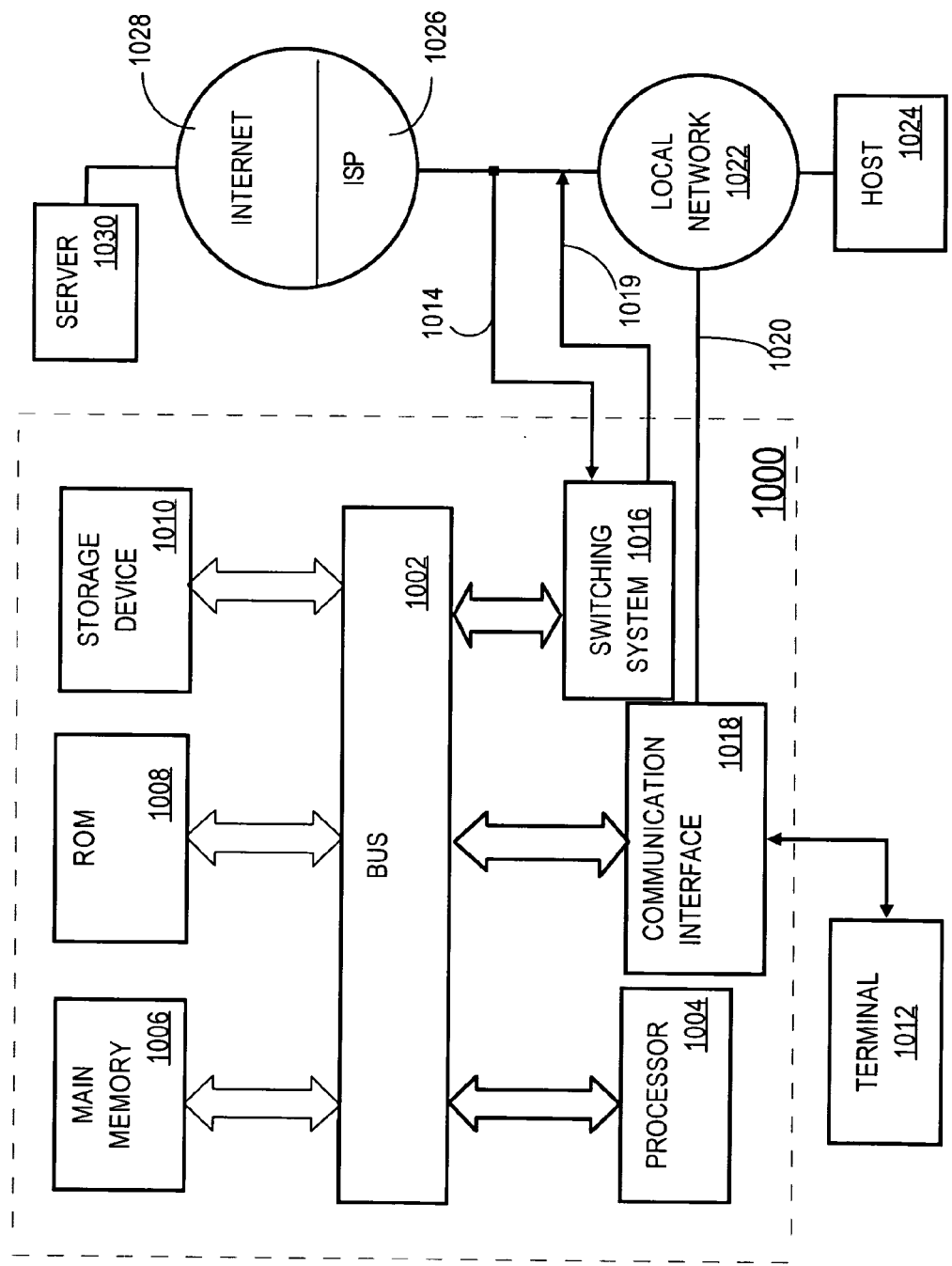
FIG. 10 is a block diagram that illustrates a computer system upon which an embodiment may be implemented.

FIG. 10 is a block diagram that illustrates a computer system 1000 upon which an embodiment of the invention may be implemented. The preferred embodiment is implemented using one or more computer programs running on a computer or network element such as a router device that provides authentication, authorization and accounting (AAA) services. Thus, in this embodiment, the computer system 1000 is a router.

Computer system 1000 includes a bus 1002 or other communication mechanism for communicating information, and a processor 1004 coupled with bus 1002 for processing information. Computer system 1000 also includes a main memory 1006, such as a random access memory (RAM), flash memory, or other dynamic storage device, coupled to bus 1002 for storing information and instructions to be executed by processor 1004. Main memory 1006 also may be used for storing temporary variables or other intermediate information during execution of instructions to be executed by processor 1004. Computer system 1000 further includes a read only memory (ROM) 1008 or other static storage device coupled to bus 1002 for storing static information and instructions for processor 1004. A storage device 1010, such as a magnetic disk, flash memory or optical disk, is provided and coupled to bus 1002 for storing information and instructions.

A communication interface 1018 may be coupled to bus 1002 for communicating information and command selections to processor 1004. Interface 1018 is a conventional serial interface such as an RS-232 or RS-422 interface. An external terminal 1012 or other computer system connects to the computer system 1000 and provides commands to it using the interface 1014. Firmware or software running in the computer system 1000 provides a terminal interface or character-based command interface so that external commands can be given to the computer system.

A switching system 1016 is coupled to bus 1002 and has an input interface 1014 and an output interface 1019 to one or more external network elements. The external network elements may include a local network 1022 coupled to one or more hosts 1024, or a global network such as Internet 1028 having one or more servers 1030. The switching system 1016 switches information traffic arriving on input interface 1014 to output interface 1019 according to predetermined protocols and conventions that are well known. For example, switching system 1016, in cooperation with processor 1004, can determine a destination of a packet of data arriving on input interface 1014 and send it to the correct destination using output interface 1019. The destinations may include host 1024, server 1030, other end stations, or other routing and switching devices in local network 1022 or Internet 1028.

The invention is related to the use of computer system 1000 for avoiding the storage of client state on computer system 1000. According to one embodiment of the invention, computer system 1000 provides for such updating in response to processor 1004 executing one or more sequences of one or more instructions contained in main memory 1006. Such instructions may be read into main memory 1006 from another computer-readable medium, such as storage device 1010. Execution of the sequences of instructions contained in main memory 1006 causes processor 1004 to perform the process steps described herein. One or more processors in a multi-processing arrangement may also be employed to execute the sequences of instructions contained in main memory 1006. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 1004 for execution. Such a medium may take many forms, including but not limited to, non-volatile media, volatile media, and transmission media. Non-volatile media includes, for example, optical or magnetic disks, such as storage device 1010. Volatile media includes dynamic memory, such as main memory 1006. Transmission media includes coaxial cables, copper wire and fiber optics, including the wires that comprise bus 1002. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 1004 for execution. For example, the instructions may initially be carried on a magnetic disk of a remote computer. The remote computer can load the instructions into its dynamic memory and send the instructions over a telephone line using a modem. A modem local to computer system 1000 can receive the data on the telephone line and use an infrared transmitter to convert the data to an infrared signal. An infrared detector coupled to bus 1002 can receive the data carried in the infrared signal and place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Communication interface 1018 also provides a two-way data communication coupling to a network link 1020 that is connected to a local network 1022. For example, communication interface 1018 may be an integrated services digital network (ISDN) card or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the worldwide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are exemplary forms of carrier waves transporting the information.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018. In accordance with the invention, one such downloaded application provides for avoiding the storage of client state on a server as described herein.

Processor 1004 may execute the received code as it is received and/or stored in storage device 1010 or other non-volatile storage for later execution. In this manner, computer system 1000 may obtain application code in the form of a carrier wave.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of avoiding the storage of client state on a server, the method comprising the computer-implemented steps of:
    based on a first local key that is not known to a first client, encrypting first client state information to produce first encrypted information, wherein the first client state information includes a first shared secret key;
    receiving the first encrypted information from the first client at a first time;
    based on the first local key, validating an authentication code received with the first encrypted information and decrypting the first encrypted information that was received from the first client, thereby producing first decrypted information;
    receiving a first message that has been encrypted based on a first derived key that was derived from the first shared secret key;
    deriving a second derived key from a shared secret key that was included in the first decrypted information; and
    based on the second derived key, further protecting an ensuing conversation between the first client and the server.

2. A method as recited in claim 1, further comprising the steps of:
    removing the first client state information from server memory before the first time; and
    removing the first encrypted information from server memory before the first time.

3. A method as recited in claim 1, further comprising the steps of:
    before sending the first encrypted information to the first client, calculating a first authentication code based on both the first local key, the server's identity, and encrypted client state information; and
    before sending the first encrypted information to the first client, encrypting the first client state information and including the authentication code with a result of the encrypting of the first client state information to produce the first encrypted information.

4. A method as recited in claim 3, further comprising the steps of:
    after decrypting the first encrypted information that was received from the first client, calculating a second authentication code based on both the first local key and encrypted client state information that was included in the first decrypted information; and
    determining whether the second authentication code matches an authentication code that was included in the first decrypted information.

5. A method as recited in claim 4, wherein the first client state information includes a value that uniquely identifies the first client.

6. A method as recited in claim 1, further comprising the steps of:
    before sending the first encrypted information to the first client, encrypting a first lifetime value along with the first client state information to produce the first encrypted information.

7. A method as recited in claim 6, further comprising the steps of:

after decrypting the first encrypted information that was received from the first client, determining, based on both a second time value and a lifetime value that was included in the first decrypted information, whether the first client state information has expired.

8. A method as recited in claim 1, further comprising the steps of:
selecting the first local key from among a plurality of keys, wherein each key in the plurality of keys is associated with a different index value and the server's identity; and
sending, to the first client, an index value that is associated with the first local key.

9. A method as recited in claim 8, further comprising the steps of:
receiving, from the first client, the index value that is associated with the first local key and the server's identity;
wherein the step of decrypting the first encrypted information comprises the step of decrypting the first encrypted information based on a key that is associated with an index value that was received from the first client.

10. A method as recited in claim 1, wherein a first server performs the step of encrypting the first client state information to produce the first encrypted information, and wherein the method further comprises the steps of:
a second server encrypting the first client state information, based on a second local key that is not known to the first client, to produce second encrypted information, wherein the second server differs from the first server, and wherein the second local key differs from the first local key;
the second server receiving the second encrypted information from the first client;
the second server validating an authentication code received with the second encrypted information and decrypting the second encrypted information that was received from the first client, thereby producing second decrypted information;
receiving a second message that has been encrypted based on a third derived key that was derived from the first shared secret key;
deriving a fourth derived key from a shared secret key that was included in the second decrypted information; and
based on the fourth derived key, further protecting an ensuing conversation between the first client and the second server.

11. A method of avoiding the storage of client state on a server, the method comprising the computer-implemented steps of:
selecting a local key from among a plurality of keys that are not known to a client, wherein each key in the plurality of keys is associated with a different index value;
calculating a first authentication code based on client encrypted state information, the server's identity, and the local key, wherein the client state information includes both a shared secret key and a value that uniquely identifies the client;
based on the local key, encrypting the client state information and a first lifetime value and grouping an encrypted result with the authentication code thereby producing encrypted information;
sending, to the client, both the encrypted information and a particular index value that is associated with the local key;

receiving the encrypted information and the particular index value;
based on a particular key that is associated with the particular index value for the server's identity, decrypting the received encrypted information, thereby producing decrypted information;
calculating a second authentication code based on both the particular key, the server's identity and client encrypted state information that was included in the decrypted information;
determining whether the second authentication code matches an authentication code that was included in the decrypted information;
determining, based on both a current time value and a lifetime value that was included in the decrypted information, whether the client state information has expired;
receiving a message that has been encrypted based on a first derived key that was derived from the shared secret key;
deriving a second derived key from a shared secret key that was included in the first decrypted information; and
based on the second derived key, further protecting an ensuing conversation between the client and the server.

12. A method of storing client state on a client, the method comprising the computer-implemented steps of:
securely storing encrypted client state information that was generated by encrypting, based on a local key, a server's identity and client state information that includes a shared secret key;
sending the encrypted client information to a first server that stores the local key; and
sending the same encrypted client information to a second server that stores the local key;
wherein the second server differs from the first server but is identified by the same server identity.

13. A method as recited in claim 12, further comprising the steps of:
receiving, from the first server, a message that has been encrypted based on a derived key that was derived from the shared secret key; and
receiving, from the second server, a message that has been encrypted based on a derived key that was derived from the shared secret key.

14. A method of storing client state on a client, the method comprising the computer-implemented steps of:
securely storing encrypted client state information that was generated by encrypting, based on a local key, a server's identity and client state information that includes a shared secret key;
sending the encrypted client information to a first server that stores the local key, wherein the local key is identified by the first server's identity; and
sending the encrypted client information to a second server that stores the local key, wherein the local key is identified by the second server's identity;
wherein the second server differs from the first server, and wherein the second server is uniquely identified by a server identity.

15. A method as recited in claim 14, further comprising the steps of:
receiving, from the first server, a message that has been encrypted based on a derived key that was derived from the shared secret key; and receiving, from the second server, a message that has been encrypted based on a derived key that was derived from the shared secret key.

16. A method of receiving client state from a client, the method comprising the computer-implemented steps of:
    based on a local key that is not known to a client, encrypting client state information to produce encrypted information, wherein the client state information includes a shared secret key;
    receiving, from the client, a Transport Security Layer (TLS) Handshake Protocol extended ClientHello message that contains the encrypted information in an extension data field of the message; and
    based on the local key, decrypting the encrypted information that was received from the client, thereby producing decrypted information that includes the shared secret key.

17. A computer-readable storage medium carrying one or more sequences of instructions for avoiding the storage of client state on a server, which instructions, when executed by one or more processors, cause the one or more processors to carry out the steps of:
    based on a local key that is not known to a first client, encrypting first client state information to produce first encrypted information, wherein the first client state information includes a first shared secret key;
    receiving the first encrypted information from the first client at a first time;
    based on the local key, decrypting the first encrypted information that was received from the first client, thereby producing first decrypted information;
    receiving a first message that has been encrypted based on a first derived key that was derived from the first shared secret key;
    deriving a second derived key from a shared secret key that was included in the first decrypted information; and
    based on the second derived key, further protecting an ensuing conversation between the client and the server.

18. A computer-readable storage medium as recited in claim 17, further comprising instructions for performing the steps of:
    removing the first client state information from memory before the first time; and
    removing the first encrypted information from memory before the first time.

19. A computer-readable storage medium as recited in claim 17, further comprising instructions for performing the steps of:
    before sending the first encrypted information to the first client, calculating a first code based on both the local key, the server's identity and client encrypted state information; and
    before sending the first encrypted information to the first client, including the first code along with an encrypted result that includes the first client state information to produce the first encrypted information.

20. A computer-readable storage medium as recited in claim 17, further comprising instructions for performing the steps of:
    after decrypting the first encrypted information that was received from the first client, calculating a second authentication code based on the server's identity, the local key, and client encrypted state information that was included in the first decrypted information; and
    determining whether the second authentication code matches an authentication code that was included in the first decrypted information.

21. A computer-readable storage medium as recited in claim 19, wherein the first client state information includes a value that uniquely identifies the first client.

22. A computer-readable storage medium as recited in claim 17, further comprising instructions for performing the steps of:
    before sending the first encrypted information to the first client, encrypting a first lifetime value along with the first client state information to produce the first encrypted information.

23. A computer-readable storage medium as recited in claim 22, further comprising instructions for performing the steps of:
    after decrypting the first encrypted information that was received from the first client, determining, based on both a second time value and a lifetime value that was included in the first decrypted information, whether the first client state information has expired.

24. A computer-readable storage medium as recited in claim 17, further comprising instructions for performing the steps of:
    selecting the local key from among a plurality of keys, wherein each key in the plurality of keys is associated with a different index value; and
    sending, to the first client, an index value that is associated with the local key.

25. A computer-readable storage medium as recited in claim 24, further comprising instructions for performing the steps of:
    receiving, from the first client, the index value that is associated with the local key;
    wherein the step of decrypting the first encrypted information comprises the step of decrypting the first encrypted information based on a key that is associated with an index value that was received from the first client.

26. A computer-readable storage medium as recited in claim 17, further comprising instructions for performing the steps of:
    generating the server's identity;
    based on the local key, encrypting second client state information to produce second encrypted information, wherein the second client state information includes a second shared secret key that differs from the first shared secret key, and wherein the local key is not known to a second client that differs from the first client;
    receiving the second encrypted information from the second client;
    based on the local key, decrypting the second encrypted information that was received from the second client, thereby producing second decrypted information;
    receiving a second message that has been encrypted based on a third derived key that was derived from the second shared secret key;
    deriving a fourth derived key from a shared secret key that was included in the second decrypted information; and
    based on the fourth derived key, further protecting an ensuing conversation between the second client and the server.

27. A computer-readable storage medium as recited in claim 17, further comprising instructions for performing the steps of:

based on a third derived key that was derived from the shared secret that was included in the first decrypted information, encrypting a second message to produce an encrypted message; and sending the encrypted message to the second client.

28. An apparatus for avoiding the storage of client state on a server, comprising:

means for encrypting, based on a local key that is not known to a client, client state information to produce encrypted information, wherein the client state information includes a shared secret key;

means for receiving the encrypted information from the client;

means for decrypting, based on the local key, the encrypted information that was received from the client, thereby producing decrypted information;

means for receiving a message that has been encrypted based on a first derived key that was derived from the shared secret key;

means for deriving a second derived key from a shared secret key that was included in the decrypted information; and means for decrypting, based on the second derived key, the message.

29. An apparatus for avoiding the storage of client state on a server, comprising:

a network interface that is coupled to a data network for receiving one or more packet flows therefrom;

a processor;

one or more stored sequences of instructions which, when executed by the processor, cause the processor to carry out the steps of:

computing the server's identity;

encrypting, based on a local key that is not known to a client, client state information to produce encrypted information, wherein the client state information includes a shared secret key;

receiving the encrypted information from the client;

decrypting, based on the local key, the encrypted information that was received from the client, thereby producing decrypted information;

receiving a message that has been encrypted based on a first derived key that was derived from the shared secret key;

deriving a second derived key from a shared secret key that was included in the decrypted information; and based on the second derived key, further protecting an ensuing conversation between the client and the server.

* * * * *